US012284443B2

(12) United States Patent
Jang et al.

(10) Patent No.: US 12,284,443 B2
(45) Date of Patent: Apr. 22, 2025

(54) SENSOR SHIFTING MODULE AND CAMERA MODULE INCLUDING THE SAME

(71) Applicant: SAMSUNG ELECTRO-MECHANICS CO., LTD., Suwon-si (KR)

(72) Inventors: Su Bong Jang, Suwon-si (KR); Sang Jong Lee, Suwon-si (KR); Hee Soo Yoon, Suwon-si (KR); Tae Ho Yun, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 281 days.

(21) Appl. No.: 17/969,316

(22) Filed: Oct. 19, 2022

(65) Prior Publication Data

US 2023/0156335 A1 May 18, 2023

(30) Foreign Application Priority Data

Nov. 18, 2021 (KR) .................. 10-2021-0159648

(51) Int. Cl.
*H04N 23/68* (2023.01)
*H04N 23/54* (2023.01)
*H04N 23/55* (2023.01)

(52) U.S. Cl.
CPC .......... *H04N 23/687* (2023.01); *H04N 23/54* (2023.01); *H04N 23/55* (2023.01)

(58) Field of Classification Search
CPC ........ H04N 23/54; H04N 23/55; H04N 23/57; H04N 23/687
See application file for complete search history.

(56) References Cited

U.S. PATENT DOCUMENTS

| | | | |
|---|---|---|---|
| 10,890,734 B1 | 1/2021 | Sharma et al. | |
| 2010/0053784 A1 | 3/2010 | Kang et al. | |
| 2011/0236008 A1 | 9/2011 | Kang et al. | |
| 2015/0350499 A1* | 12/2015 | Topliss | H04N 23/54 348/373 |
| 2016/0127646 A1* | 5/2016 | Osborne | H04N 23/6812 396/55 |

(Continued)

FOREIGN PATENT DOCUMENTS

| | | |
|---|---|---|
| CN | 210381098 U | 4/2020 |
| CN | 111355872 A | 6/2020 |

(Continued)

OTHER PUBLICATIONS

Korean Office Action Issued on Feb. 21, 2023, in counterpart Korean Patent Application No. 10-2021-0159648 (7 Pages in English, 5 Pages in Korean).

*Primary Examiner* — Antoinette T Spinks
(74) *Attorney, Agent, or Firm* — NSIP Law

(57) ABSTRACT

A sensor shifting module includes a fixed body, a first body movably disposed in the fixed body, a second body movably disposed in the first body and coupled to an image sensor having an imaging plane facing a first direction, a first driver configured to move the second body in a direction orthogonal to the first direction with respect to the first body, a second driver configured to rotate the second body about an axis parallel to the first direction with respect to the first body; and a third driver configured to rotate the first body about an axis orthogonal to the first direction with respect to the fixed body.

20 Claims, 17 Drawing Sheets

(56) References Cited

U.S. PATENT DOCUMENTS

| | | | |
|---|---|---|---|
| 2020/0314338 A1* | 10/2020 | Johnson | H04N 23/68 |
| 2021/0266465 A1 | 8/2021 | Wang et al. | |
| 2023/0156328 A1* | 5/2023 | Jang | H04N 23/675 |
| | | | 348/349 |
| 2023/0164438 A1* | 5/2023 | Jang | H04N 23/54 |
| | | | 348/208.11 |
| 2023/0353858 A1* | 11/2023 | Oh | H04N 23/58 |

FOREIGN PATENT DOCUMENTS

| | | |
|---|---|---|
| CN | 112839176 A | 5/2021 |
| EP | 4 102 820 A1 | 12/2022 |
| KR | 10-2010-0026882 A | 3/2010 |
| KR | 10-2011-0106664 A | 9/2011 |
| KR | 10-2017-0005399 A | 1/2017 |
| KR | 10-2021-0100430 A | 8/2021 |

* cited by examiner

SENSOR SHIFTING MODULE AND CAMERA MODULE INCLUDING THE SAME

CROSS-REFERENCE TO RELATED APPLICATIONS

This application claims the benefit under 35 USC 119(a) of Korean Patent Application No. 10-2021-0159648 filed on Nov. 18, 2021, in the Korean Intellectual Property Office, the entire disclosure of which is incorporated herein by reference for all purposes.

BACKGROUND

1. Field

The present disclosure relates to a method of implementing optical image stabilization by driving an image sensor.

2. Description of the Background

With the development of communications technology, mobile devices such as smartphones may be widely distributed, and accordingly, functions of a camera included in mobile devices may be in increasing demand. For example, a camera included in a mobile device may be designed to provide advanced imaging functions (e.g., an auto-focus function, an anti-shake function, and the like) implemented in a general digital single-lens reflex camera (DSLR) camera despite a small size thereof.

The optical image stabilization (OIS) function may be to prevent image blur occurring when a camera is shaken during the exposure time, and the OIS function may be necessary when imaging in low-light environment in which a camera is shaken and the exposure time is relatively long. The OIS may include digital IS (DIS), electronic IS (EIS), and optical IS (OIS). Among these functions, optical IS (OIS) may fundamentally prevent image deterioration caused by shaking by correcting an optical path by moving a lens or image sensor in a direction orthogonal to the optical axis. Since a mechanical actuator is necessary, it may be complicated to be implemented as a device, and although relevant costs are expensive, excellent compensation performance may be obtained.

A lens barrel may include an optical system therein, such that a relatively large amount of force may be required to drive the lens barrel. Since an image sensor is relatively light, it may be advantageous to implement an excellent optical image stabilization (OIS) function even with a relatively small amount of force.

A camera employed in a mobile device may mainly provide a shaking correction function of preventing only the shaking in a direction orthogonal to an optical axis when obtaining an image. Mobile devices may be used to obtain videos, and accordingly, it may be necessary to move an image sensor in more various directions to correct shaking in a more dynamic environment.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a sensor shifting module includes a fixed body, a first body movably disposed in the fixed body, a second body movably disposed in the first body and coupled to an image sensor having an imaging plane facing a first direction, a first driver configured to move the second body in a direction orthogonal to the first direction with respect to the first body, a second driver configured to rotate the second body about an axis parallel to the first direction with respect to the first body, and a third driver configured to rotate the first body about an axis orthogonal to the first direction with respect to the fixed body, wherein the third driver includes a tilt guide ball disposed between the fixed body and the first body and to provide a tilt center for the first body.

The first driver may include a first actuator disposed between the first body and the second body, and the first actuator may include a first driving magnet disposed on the second body, and a first driving coil disposed on the first body to oppose the first driving magnet in a direction orthogonal to the first direction.

The second driver may include a second actuator disposed between the first body and the second body, and the second actuator may include a second driving magnet disposed on the second body, and a second driving coil disposed on the first body to oppose the second driving magnet in a direction orthogonal to the first direction.

The second body may have four side surfaces forming a quadrangular shape, and the first driving magnet and the second driving magnet may be disposed on different side surfaces among the four side surfaces.

The second body may have a first side surface and a second side surface forming a corner, and the second driving magnet may be disposed on the first side surface or the second side surface and may be disposed adjacent to the corner.

The third driver may include a third actuator disposed between the first body and the fixed body, and the third actuator may include a third driving magnet disposed on the second body, and a third driving coil disposed on the fixed body to oppose the third driving magnet in the first direction.

The third driving magnet may be the first driving magnet or the second driving magnet.

The third driver may include a first magnetic member and a second magnetic member disposed on the fixed body and the first body, respectively, and opposing each other in the first direction.

The sensor shifting module may further include a substrate mechanically connecting the second body to the first body and being deformed according to movement of the second body with respect to the first body.

The substrate may include electrical wirings electrically connected to the image sensor.

The substrate may include a movable portion fixedly coupled to the second body, a fixed portion fixedly coupled to the first body, and a supporting portion interconnecting the movable portion and the fixed portion, and the supporting portion may include a plurality of bridges having the electrical wirings embedded therein The supporting portion may include a guide disposed between the movable portion and the fixed portion and connected to the movable portion and the fixed portion through the plurality of bridges.

A camera module may include the sensor shifting module, and a lens module including at least one lens, wherein light incident through the at least one lens falls on the imaging plane.

In another general aspect, a camera module includes a lens module including at least one lens, and a sensor shifting module, wherein the sensor shifting module includes a fixed body, a first body movably disposed in the fixed body, a second body movably disposed in the first body and coupled to an image sensor having an imaging plane facing a first direction, a first driver configured to move the second body in a direction orthogonal to the first direction with respect to the first body, a second driver configured to rotate the second body about an axis parallel to the first direction with respect to the first body, a third driver configured to rotate the first body about an axis orthogonal to the first direction with respect to the fixed body, and a substrate mechanically connecting the second body to the first body and being deformed according to movement of the second body with respect to the first body.

The substrate may include a movable portion fixedly coupled to the second body, a fixed portion fixedly coupled to the first body, and a supporting portion interconnecting the movable portion and the fixed portion, and the supporting portion may include a plurality of bridges having electrical wirings electrically connected to the image sensor embedded therein.

The third driver may include a third actuator disposed between the first body and the fixed body, and the third actuator may include a third driving magnet disposed on the second body, and a third driving coil disposed on the fixed body to oppose the third driving magnet in the first direction.

The first driver or the second driver may include a driving coil and a driving magnet opposing each other in a direction orthogonal to the first direction, and the driving magnet may be the third driving magnet.

In another general aspect, a sensor shifting module includes a first body, a second body disposed on the first body, an image sensor disposed on the second body and comprising an imaging plane facing a first direction, a first driver configured to translate the second body in a direction orthogonal to the first direction with respect to the first body, a second driver configured to rotate the second body about an axis parallel to the first direction with respect to the first body, and a third driver configured to rotate the first body about an axis orthogonal to the first direction with respect to a fixed body.

The sensor shifting module may further include a tilt guide ball disposed between the first body and the fixed body, wherein the first body may be configured to rotate about the axis orthogonal to the first direction on the tilt guide ball, and a substrate mechanically connecting the second body to the first body and being deformed according to movement of the second body with respect to the first body.

A camera module may include the sensor shifting module, and a lens module including at least one lens, wherein light incident through the at least one lens may fall on the imaging plane in the first direction.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
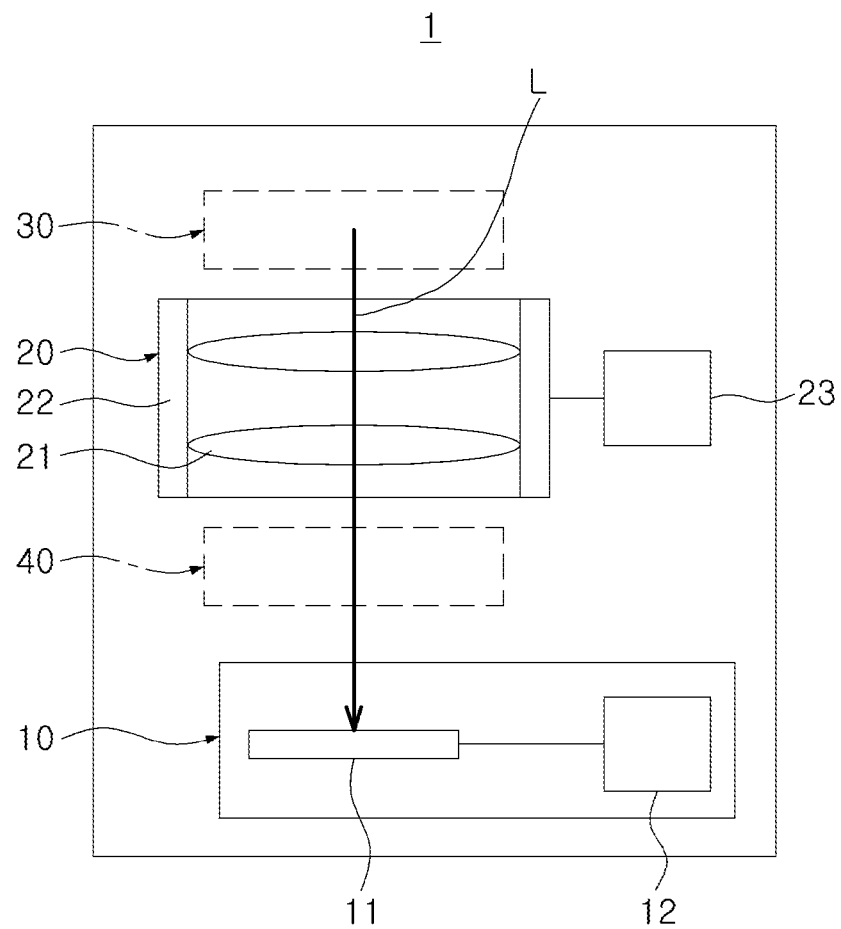
FIG. 1 is a diagram illustrating components included in a camera module according to an example embodiment of the present disclosure.

Hereinafter, while example embodiments of the present disclosure will be described in detail with reference to the accompanying drawings as follows, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Herein, it is noted that use of the term "may" with respect to an example or embodiment, e.g., as to what an example or embodiment may include or implement, means that at least one example or embodiment exists in which such a feature is included or implemented while all examples and examples are not limited thereto.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other manners (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

In the example embodiments, the X-direction, the Y-direction, and the Z-direction may refer to a direction parallel to the X axis, a direction parallel to the Y axis, and a direction parallel to the Z axis, respectively, in the drawings. Also, unless otherwise indicated, the X-direction may include both the +X-axis direction and the −X-axis direction, which may also apply to the Y-direction and the Z-direction.

In the example embodiments, two directions (or axes) are parallel to each other may also include the examples in which the two directions (or axes) are substantially parallel to or substantially side by side to each other. In the example embodiments, two directions orthogonal to each other may also include the examples in which the two directions (or axes) are substantially perpendicular to or substantially 90 degrees to each other. For example, the configuration in which the first axis and the second axis are orthogonal to each other may indicate that the first axis and the second axis may form an angle of 90 degrees or approximate to 90 degrees.

"An example embodiment" does not necessarily indicate the same example embodiments. The particular features, structures, or characteristics may be combined in any suitable manner consistent with the example embodiments.

In the example embodiments, "configured to" may indicate that a component may include a structure necessary to implement a function.

The features of the examples described herein may be combined in various manners as will be apparent after gaining an understanding of this disclosure. Further, although the examples described herein have a variety of configurations, other configurations are possible as will be apparent after gaining an understanding of this disclosure.

One or more example embodiments of the present disclosure may enable a camera to provide an effective optical image stabilization function with low power, and to provide an improved shaking correction function by driving an image sensor in various directions.

1. Camera Module

FIG. 1 is a diagram illustrating components included in a camera module 1 according to an example embodiment.

In an example embodiment, the camera module 1 may include a lens module 20 including at least one lens 21 and a lens barrel 22 accommodating the at least one lens 21, and an image sensor 11. Light L may pass through the lens module 20 and may reach an imaging plane of the image sensor 11. The camera module 1 may include an AF driver 23 which may move the lens module 20 in an optical axis direction to adjust a focal length. The AF driver 23 may include, for example, a coil and a magnet opposing each other. The coil may be fixedly coupled to the lens module 20, the magnet may be coupled to a fixed body such as a housing, and electromagnetic interaction between the coil and the magnet may allow the lens module 20 to move in the optical axis direction.

In an example embodiment, the camera module 1 may provide an optical image stabilization (hereinafter, "OIS") function. The camera module 1 may provide an OIS function by driving the image sensor 11. For example, the camera module 1 may include an OIS driver 12 configured to move the image sensor 11 in a direction orthogonal to the optical axis, and/or to rotate the image sensor 11 about an axis parallel to the optical axis and/or about an axis orthogonal to the optical axis.

In an example embodiment, the camera module 1 may include a sensor shifting module 10. The sensor shifting module 10 may include components necessary to implement the OIS function by driving the image sensor 11. For example, the sensor shifting module 10 may include the image sensor 11 and the OIS driver 12 for driving the image sensor 11. As another example, the sensor shifting module 10 may refer to only the OIS driver 12 excluding the image sensor 11.

In an example embodiment, the camera module 1 may further include an optical element in addition to the lens module 20 and the image sensor 11. In an example embodiment, the camera module 1 may include two or more lens modules. For example, the first optical element 30 and/or the second optical element 40 may be a lens module distinct from the lens module 20.

In an example embodiment, the camera module 1 may include an optical path changing element disposed in front of the lens module 20. For example, the first optical element 30 may be implemented as a prism or a mirror. In another example embodiment, the optical path changing element may be disposed between the image sensor 11 and the lens module 20. For example, the second optical element 40 may be implemented as a prism or a mirror.

Hereinafter, the sensor shifting module 100 described with reference to FIGS. 2A to 8D may be applied to the camera module 1 in FIG. 1.

2. Sensor Shift

Figure 2A:
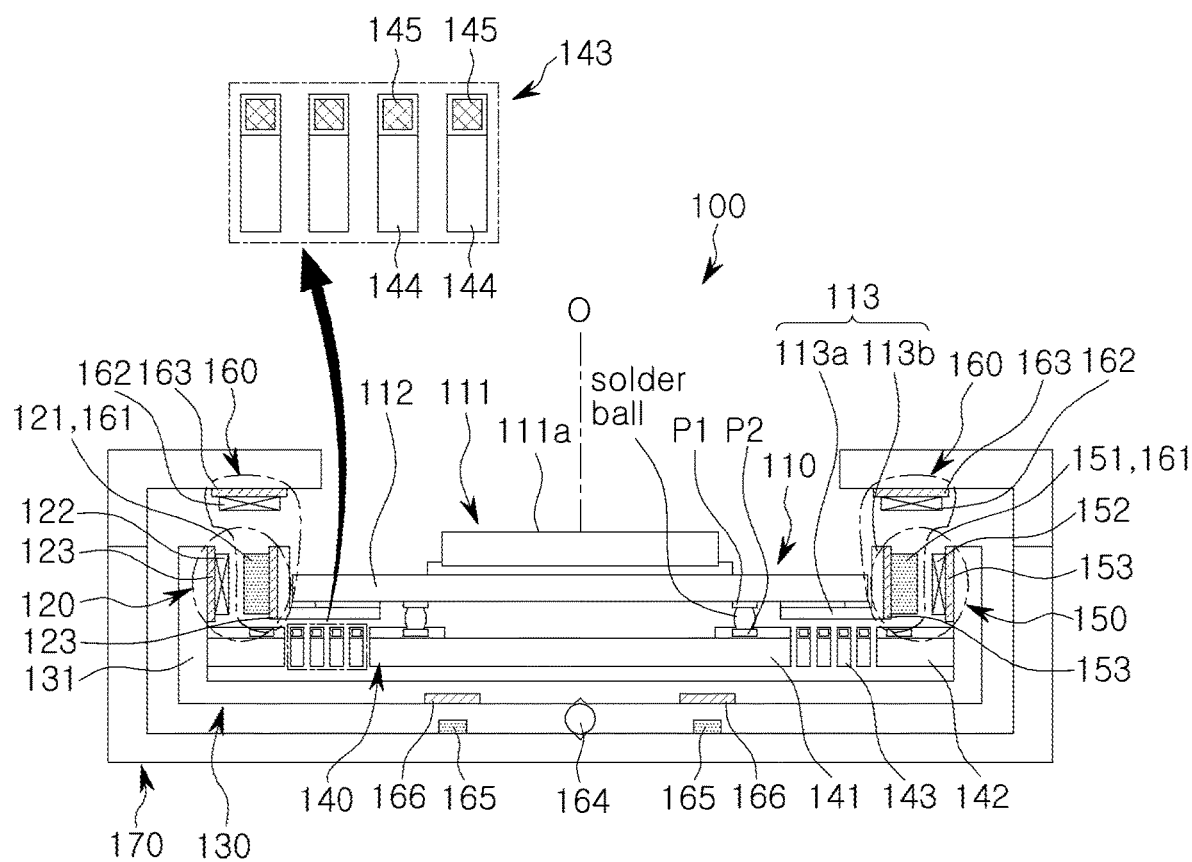
FIG. 2A is a diagram illustrating a sensor shifting module according to an example embodiment of the present disclosure.
Figure 2A:
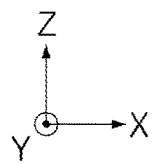
Figure 2B:
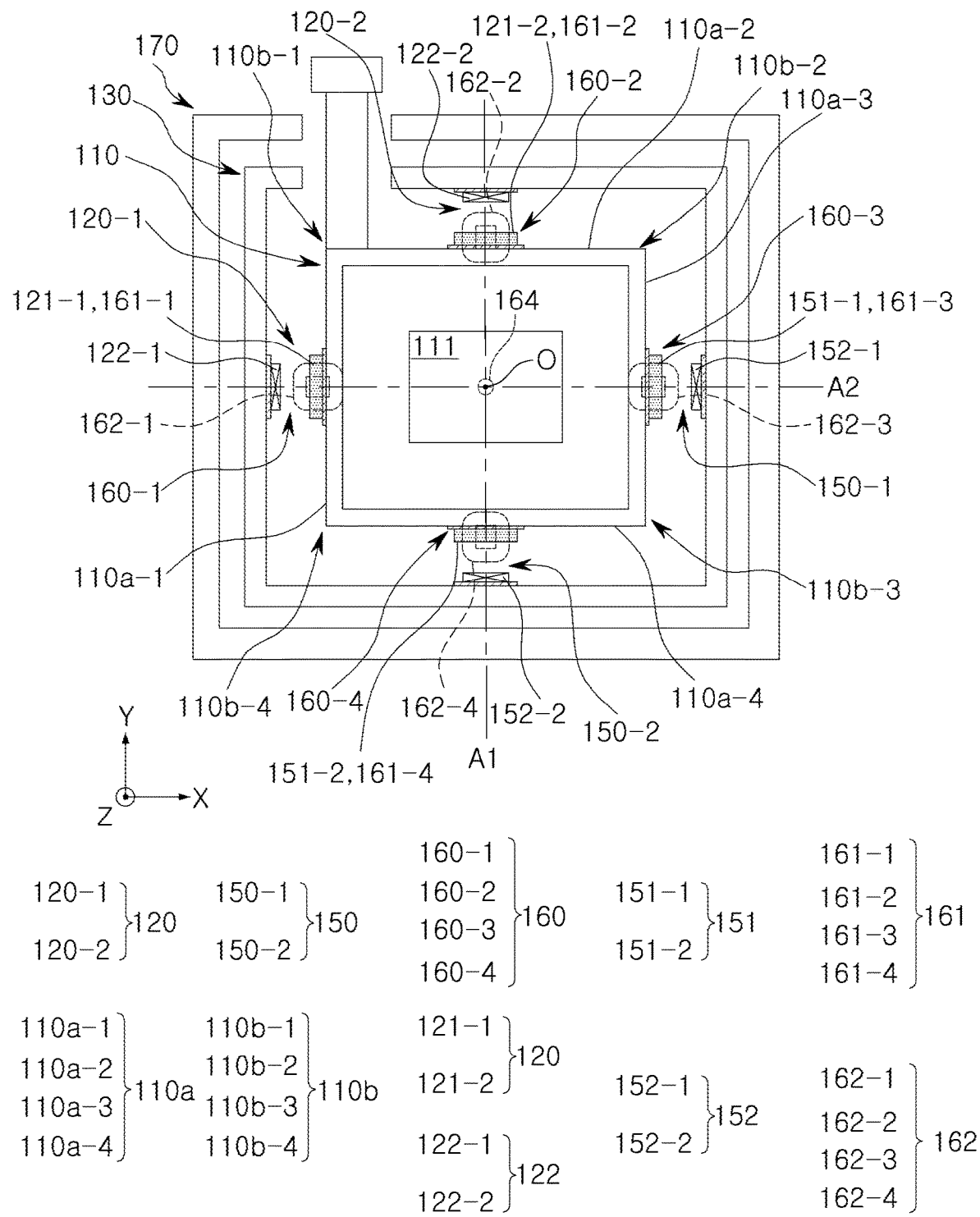
FIG. 2B is a diagram illustrating actuators included in an OIS driving unit according to an example embodiment of the present disclosure.
Figure 2C:
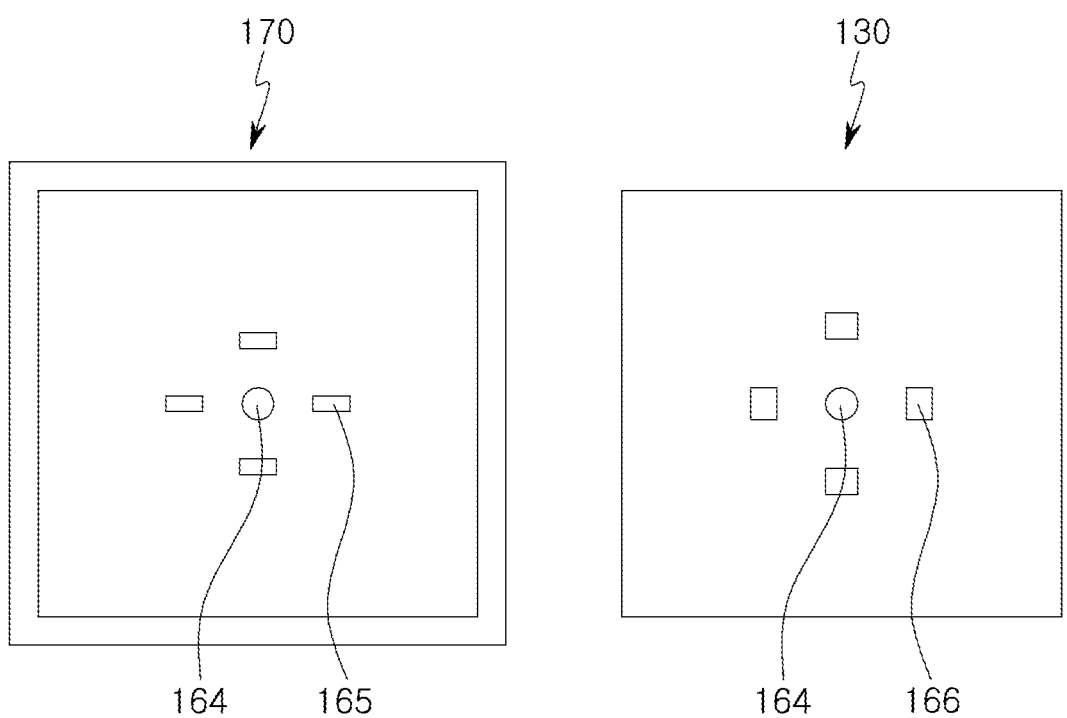
FIG. 2C is a diagram illustrating a pulling member between a first movable body and a fixed body according to an example embodiment of the present disclosure.

FIG. 2A is a diagram illustrating a sensor shifting module 100 according to an example embodiment. FIG. 2B is a diagram illustrating actuators included in an OIS driver according to an example embodiment. FIG. 2C is a diagram illustrating a pulling member between a first movable body and a fixed body according to an example embodiment.

The sensor shifting module 100 may include an OIS driver. The OIS driver may include at least one of a first OIS driver, a second OIS driver, and a third OIS driver, which will be described later. The first OIS driver may move the image sensor 111 in a direction orthogonal to the optical axis, the second OIS driver may rotate the image sensor 111 about an axis parallel to the optical axis, and the third OIS driver may rotate the image sensor 111 about an axis orthogonal to the optical axis.

The OIS driver 12 of the camera module 1 in FIG. 1 may include at least one of the first OIS driver, the second OIS driver, and the third OIS driver.

2.1. Translation+Rolling OIS 2.1.1. Structure

The sensor shifting module 100 may include a first OIS driver for driving the image sensor 111. In an example embodiment, the sensor shifting module 100 may include a second movable body 110 including an image sensor 111 and a first movable body 130 carrying the second movable body 110. The second movable body 110 may be movably disposed in the first movable body 130. The second movable body 110 may be configured to move together with the image sensor 111. For example, the second movable body 110 may include a sensor substrate 112 on which the image sensor 111 is mounted and a sensor holder 113 coupled to the sensor substrate 112. The second movable body 110 may move in a direction orthogonal to the optical axis with respect to the first movable body 130 by the first OIS driver.

Referring to FIG. 2A, the sensor holder 113 may include a plate 113a connected to the lower portion of the sensor substrate 112, and an extension portion 113b extending from an edge of the plate 113a to the upper portion (in the +Z-direction). The extension portion 113b may oppose the coils 122 and 152, and the magnets 121, 151, and 161 may be seated on the extension portion 113b.

A signal of the image sensor 111 may be transmitted to another electronic component (e.g., an image signal processor (ISP)) through the sensor substrate 112 and a connector.

The first movable body 130 may include a base 131 and components fixedly coupled to the base 131. For example, the first movable body 130 may include a driving magnet 121 of a first OIS driver and a driving magnet 151 of a second OIS driver, which will be described later.

In an example embodiment, the sensor shifting module 100 may include a first OIS driver for moving the image sensor 111 in a direction orthogonal to the optical axis O. The second movable body 110 may, through the first OIS driver, move in a direction orthogonal to a direction in which the imaging plane 111a of the image sensor 111 is directed with respect to the first movable body 130. In an example embodiment, the first OIS driver may correct the shaking of the camera module 1 or the electronic device on which the image sensor 111 is mounted in a direction orthogonal to the optical axis O. In an example embodiment, the first OIS driver may move the image sensor 111 in a first direction and a second direction orthogonal to the optical axis O. The first direction and the second direction may intersect each other. For example, when the optical axis O is in the Z-direction, the first OIS driver may move the second movable body 110 in the X-direction and/or the Y-direction orthogonal to the Z axis (optical axis direction), thereby correcting the shaking in the X-direction and/or the Y-direction.

In the example embodiment, the direction in which the imaging plane 111a of the image sensor 111 is directed may be referred to as an optical axis O direction. That is, the second movable body 110 may move in a direction orthogonal to the optical axis O with respect to the first movable body 130. In the drawings, the optical axis O may be parallel to the Z axis, and accordingly, the Z-direction may refer to a direction parallel to the optical axis O. Also, the X-direction or the Y-direction may refer to a direction orthogonal to the optical axis O. For example, in the example embodiment, the configuration in which the second movable body 110 moves in the X-direction may indicate that the second movable body 110 may move in a direction orthogonal to the optical axis O. For another example, the configuration in which the driving magnet 121 and the driving coil 122 oppose each other in the X-direction may indicate that the driving magnet 121 and the driving coil 122 oppose each other in a direction orthogonal to the optical axis O. Also, the X-direction and the Y-direction may be an example of two directions orthogonal to the optical axis and intersecting each other, and in the example embodiment, the X-direction and the Y-direction may be configured as two directions orthogonal to the optical axis O and intersecting each other.

In an example embodiment, the sensor shifting module 100 may include a second OIS driver for rotating the image sensor 111 about an axis parallel to the optical axis O. The second movable body 110 may, through the second OIS driver, rotate with respect to the fixed body 170 about an axis parallel to the direction in which the imaging plane 111a of the image sensor 111 is directed. In an example embodiment, the second OIS driver may correct rotation of the camera module 1 or the electronic device on which the image sensor 111 is mounted about an axis parallel to the optical axis O.

2.1.2 First Actuator (Translation)

Referring to FIGS. 2A and 2B, in an example embodiment, the first OIS driver may include a first actuator 120 disposed between the first movable body 130 and the second movable body 110. In an example embodiment, the first actuator 120 may include a first driving magnet 121 coupled to the second movable body 110, and a first driving coil 122 coupled to the first movable body 130. For example, referring to FIG. 2A, in an example embodiment, the first driving coil 122 and the first driving magnet 121 may be coupled to the base 131 and the sensor holder 113, respectively. The first driving magnet 121 and the first driving coil 122 may oppose each other in a direction (e.g., the X-direction or the Y-direction) orthogonal to the optical axis O. Electromagnetic interaction between the first driving magnet 121 and the first driving coil 122 may move the second movable body 110 in a direction orthogonal to the optical axis O with respect to the first movable body 130.

The first OIS driver may include a plurality of first actuators 120, and each of the first actuators 120 may include a first driving magnet 121 and a first driving coil 122. For example, the first OIS driver may include a 1-1 actuator 120-1 disposed on the first side surface 110a-1 of the second movable body 110 and a 1-2 actuator 120-2 disposed on the second side surface 110a-2 of the second movable body 110. Referring to FIG. 2B, a 1-1 actuator 120-1 may include a 1-1 driving magnet 121-1 and a 1-1 driving coil 122-1. The 1-2 actuator 120-2 may include a 1-2 driving magnet 121-2 and a 1-2 driving coil 122-2.

In an example embodiment, the first OIS driver may further include a yoke 123 disposed on one side of the first driving magnet 121 and/or the first driving coil 122. The yoke 123 attached to one side of the first driving coil 122 may allow the magnetic field created by the first driving coil 122 to be concentrated in a direction toward the first driving magnet 121. Since the yoke 123 is disposed on one side of the first driving coil 122, the magnetic field created by the first driving coil 122 may be prevented from affecting the other electronic components or the effect of the magnetic field on the other electronic components may be reduced. The yoke 123 attached to one side of the first driving magnet 121 may allow the magnetic field created by the first driving magnet 121 to be concentrated in a direction toward the first driving coil 122.

In the example embodiments, the first driving coil 122 and the first driving magnet 121 may be coupled to the first movable body 130 and the second movable body 110, respectively, but an example embodiment thereof is not limited thereto. In another example embodiment, the first driving coil 122 and the first driving magnet 121 may be coupled to the second movable body 110 and the first movable body 130, respectively. For example, the first driving coil 122 and the first driving magnet 121 may be coupled to the sensor holder 113 and the base 131, respectively.

2.1.3 Second Actuator (Rolling)

Referring to FIGS. 2A and 2B, in an example embodiment, the second OIS driver may include a second actuator 150 disposed between the first movable body 130 and the second movable body 110. In an example embodiment, the second actuator 150 may include a second driving magnet 151 coupled to the second movable body 110, and a second driving coil 152 coupled to the first movable body 130. For example, referring to FIG. 2A, in an example embodiment, the second driving coil 152 and the second driving magnet 151 may be coupled to the base 131 and the sensor holder 113, respectively. The second driving magnet 151 and the second driving coil 152 may oppose each other in a direction orthogonal to the optical axis O. Electromagnetic interaction between the second driving magnet 151 and the second driving coil 152 may rotate the second movable body 110 about an axis parallel to the optical axis O with respect to the first movable body 130.

The second OIS driver may include a plurality of second actuators 150, and each of the second actuators 150 may include a second driving magnet 151 and a second driving coil 152. For example, the second OIS driver may include a 2-1 actuator 150-1 disposed on the third side surface 110a-3 of the second movable body 110 and a 2-2 actuator 150-2 disposed on the fourth side surface 110a-4 of the second movable body 110. Referring to FIG. 2B, the 2-1 actuator 150-1 may include a 2-1 driving magnet 151-1 and a 2-1 driving coil 152-1. The 2-2 actuator 150-2 may include a 2-2 driving magnet 151-2 and a 2-2 driving coil 152-2.

In an example embodiment, the second OIS driver may further include a yoke 153 disposed on one side of the second driving magnet 151 and/or the second driving coil 152. The yoke 153 attached to one side of the second driving coil 152 may allow the magnetic field created by the second driving coil 152 to be concentrated in a direction toward the second driving magnet 151. Since the yoke 153 is disposed on one side of the second driving coil 152, the magnetic field created by the second driving coil 152 may be prevented from affecting the other electronic components or the effect of the magnetic field on the other electronic components may be reduced. The yoke 153 attached to one side of the second driving magnet 151 may allow the magnetic field created by the second driving magnet 151 to be concentrated in a direction toward the second driving coil 152.

In the example embodiment, the second driving coil 152 and the second driving magnet 151 may be coupled to the first movable body 130 and the second movable body 110, respectively, but an example embodiment thereof is not limited thereto. In another example embodiment, the second driving coil 152 and the second driving magnet 151 may be coupled to the second movable body 110 and the first movable body 130, respectively. For example, the second driving coil 152 and the second driving magnet 151 may be coupled to the sensor holder 113 and the base 131, respectively.

2.1.4. PCB Spring

In an example embodiment, the sensor shifting module 100 may include a substrate 140 mechanically connecting the second movable body 110 to the first movable body 130. The substrate 140 may couple the second movable body 110 to the first movable body 130 such that the second movable body 110 may move on a plane orthogonal to the optical axis with respect to the first movable body 130. A portion of the substrate 140 may be deformed according to the movement of the second movable body 110 with respect to the first movable body 130. That is, a portion of the substrate 140 may be flexible. When the substrate 140 is deformed, a restoring force may be created in the substrate 140, and the restoring force may allow the second movable body 110 to return to the original position. The second movable body 110 in the equilibrium state may move with respect to the first movable body 130 as a current is applied to the first driving coil 122 or the second driving coil 152, and when no current flows through the first driving coil 122 and the second driving coil 152, the second movable body 110 may return to the original position by the substrate 140.

Figure 3:
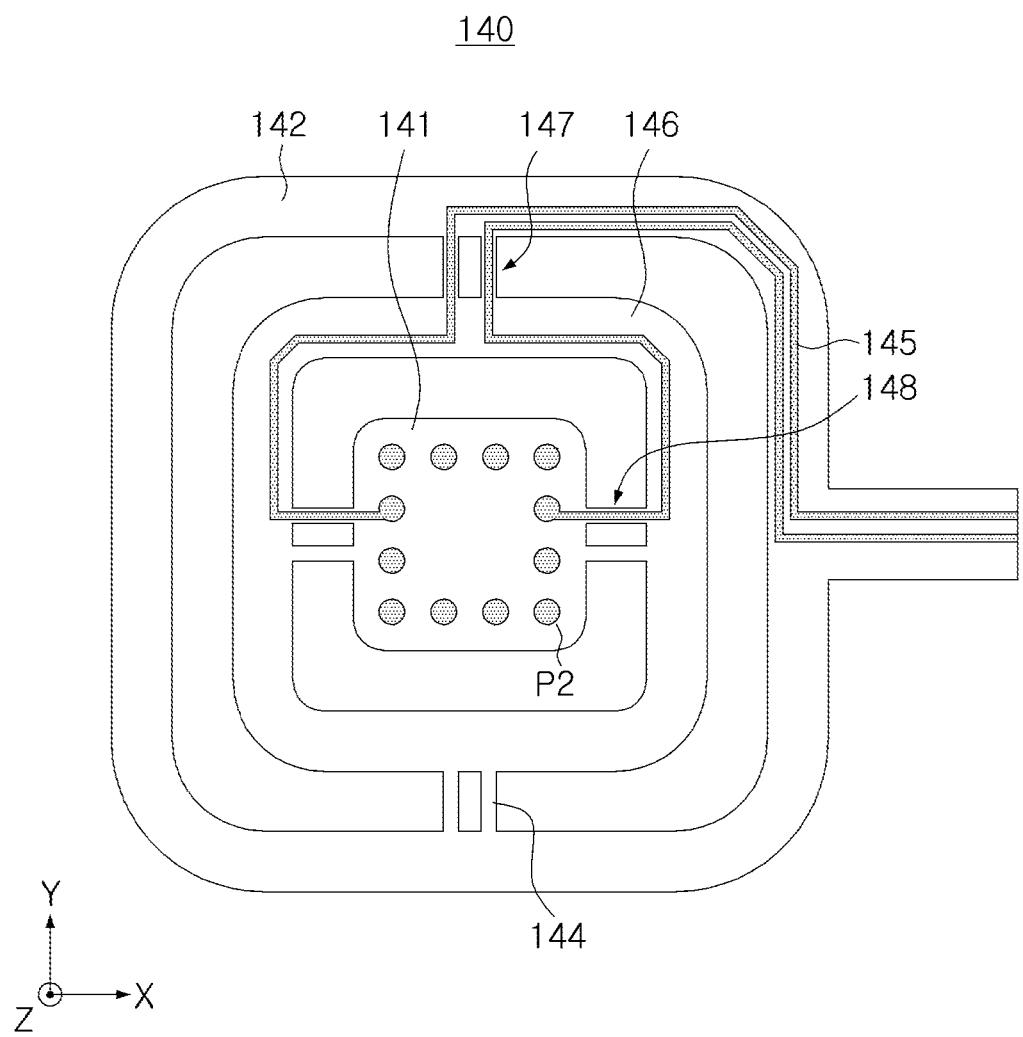
FIG. 3 is a diagram illustrating a substrate on which an image sensor is mounted according to an example embodiment of the present disclosure, viewed from above.

FIG. 3 is a diagram illustrating a substrate on which an image sensor may be mounted according to an example embodiment, viewed from above. Referring to FIGS. 2A to 2C and 3, the substrate 140 may include a movable portion 141 (a floating portion) on which the sensor substrate 112 is seated, and a fixed portion 142 fixed to the first movable body 130. The sensor substrate 112 and the movable portion 141 may be electrically connected to each other through solder balls at corresponding contact points P1 and P2.

While the second movable body 110 (or the image sensor 111) moves relative to the first movable body 130, the movable portion 141 may move relative to the fixed portion 142. The substrate 140 may include a supporting portion 143 connecting the movable portion 141 to the fixed portion 142. At least a portion of the supporting portion 143 may be deformed according to the relative movement between the movable portion 141 and the first movable body 130. For example, the supporting portion 143 may be configured as a flexible substrate. The flexible substrate may be provided in a form in which a conductive pattern (or an electrical trace 145) is formed in a film formed of a polyimide material.

In an example embodiment, the substrate 140 may include a plurality of bridge elements 144 connecting the movable portion 141 to the fixed portion 142. The plurality of bridge elements 144 may be included in at least a portion of the supporting portion 143. The plurality of bridge elements 144 may be formed of a flexible material, such that the plurality of bridge elements 144 may be deformed when the movable portion 141 moves relative to the fixed portion 142. When the second movable body 110 moves relative to the first movable body 130, the movable portion 141 may move relative to the fixed portion 142, and the bridge elements 144 may be deformed. A restoring force created as the bridge elements 144 are deformed may allow the second movable body 110 or the movable portion 141 to return to the original position. Each of the plurality of bridge elements 144 may include at least one electrical wiring 145. That is, the plurality of bridge elements 144 may mechanically and electrically connect the movable portion 141 (or the second movable body 110) to the fixed portion 142 (or the first movable body 130). That is, the bridge elements 144 may support the image sensor 111 and may function as a passage through which a signal of the image sensor 111 is transmitted.

In an example embodiment, the substrate 140 may include a guide 146 disposed between the movable portion 141 and the fixed portion 142. For example, the guide 146 may be provided in the form of a picture frame surrounding the movable portion 141. The fixed portion 142, the guide 146, and the movable portion 141 may be connected to each other via the bridge elements 144. For example, the substrate 140 may include a first bridge 147 extending from the movable portion 141 to the guide 146 and a second bridge 148 extending from the guide 146 to the fixed portion 142. The first bridge 147 and the second bridge 148 may extend in a direction orthogonal to the optical axis. The first bridge 147 and the second bridge 148 may extend in directions intersecting each other. For example, the first bridge 147 may extend in the Y-direction, and the second bridge 148 may extend in the Z-direction.

Each of the first bridge 147 and the second bridge 148 may include one or more bridge elements 144. In FIG. 3, the first bridge 147 may include four bridge elements 144 extending in the X-direction, and the second bridge 148 may include four bridge elements 144 extending in the Y-direction. The substrate 140 in FIG. 3 may be an example, and the form of the supporting portion 143 connecting the movable portion 141 to the fixed portion 142 may be varied. For example, the supporting portion 143 may include a plurality of bridge elements 144 extending directly from the movable portion 141 to the fixed portion 142. As another example, the first bridge 147 or the second bridge 148 may include five bridge elements 144. The number of bridge elements 144 included in the first bridge 147 or the second bridge 148 may correspond to the number corresponding to terminals of the image sensor 111.

The substrate 140 may include an electrical wiring 145 for transmitting a signal of the image sensor 111. A plurality of bridge elements 144 included in the supporting portion 143 may embed the electrical wiring 145 therein. The image sensor 111 may be mounted on the sensor substrate 112, and the sensor substrate 112 may be electrically connected to the fixed portion 142 of the substrate 140. An electrical wiring 145 (electrical trace) may extend from each of the contact points P2 formed in the movable portion 141. The electrical wiring 145 may extend to the fixed portion 142 through the bridge element 144. The electrical wiring 145 extending to the fixed portion may be electrically connected to another substrate or electronic component.

FIG. 3 illustrates the electrical wiring 145 formed on the substrate 140, and only the electrical wiring 145 extending from a portion of the contact points is illustrated for ease of description.

In an example embodiment, the first OIS driver may include a first position sensor which may measure how much the second movable body 110 moves in a direction orthogonal to the optical axis O. The first position sensor may be configured as a Hall sensor or a magnetoresistive sensor. In an example embodiment, the first position sensor may be disposed in the first driving coil 122 to oppose the first driving magnet 121. The internal portion of the coil may refer to an empty space corresponding to the winding center of the coil. In another example embodiment, the first OIS driver may include a sensing magnet distinct from the first driving magnet 121, and the first position sensor may be disposed to oppose the sensing magnet. For example, the first position sensor and the sensing magnet may be disposed to oppose the base 131 or the substrate 140 in the optical axis direction (in the Z-direction).

In an example embodiment, the second OIS driver may include a second position sensor which may measure how much the second movable body 110 rotates about an axis parallel to the optical axis O. The second position sensor may be configured as a Hall sensor or a magnetoresistance sensor. In an example embodiment, the second position sensor may be disposed in the second driving coil 152 to oppose the second driving magnet 151. In another example embodiment, the second OIS driver may include a sensing magnet distinct from the second driving magnet 151, and the second position sensor may be disposed to oppose the sensing magnet. For example, the second position sensor and the sensing magnet may be disposed to oppose the base 131 or the substrate 140 in the optical axis direction (in the Z-direction).

The second position sensor may be the same component as the first position sensor. That is, one position sensor may be used to measure both translational movement (movement by the first OIS driver) and rotational movement (movement by the second OIS driver) of the second movable body.

2.1.4. Arrangement of Actuator

Figure 4A:
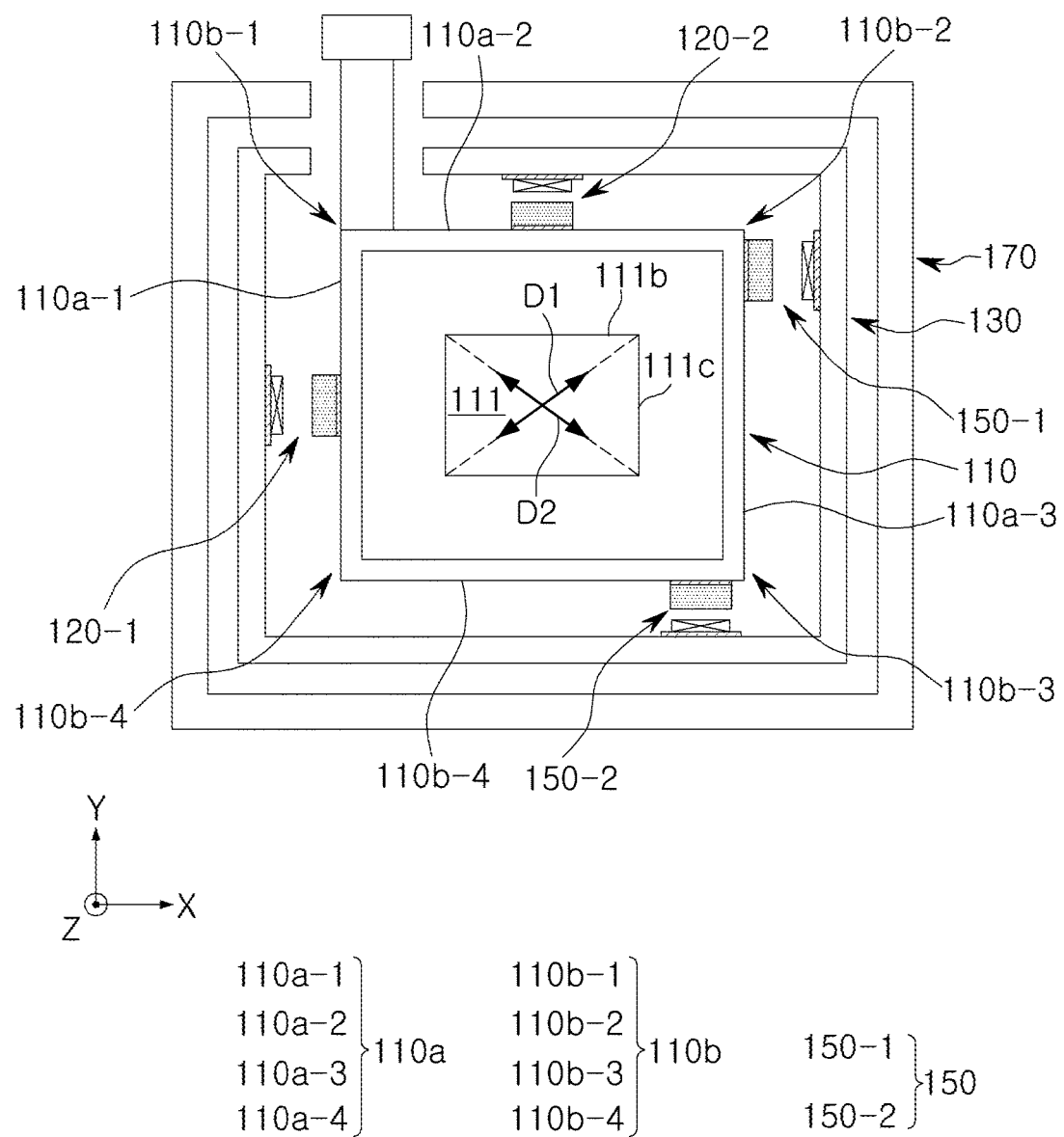
FIGS. 4A and 4B are diagrams illustrating arrangement of a first OIS driver and a second OIS driver according to an example embodiment of the present disclosure.
Figure 4B:
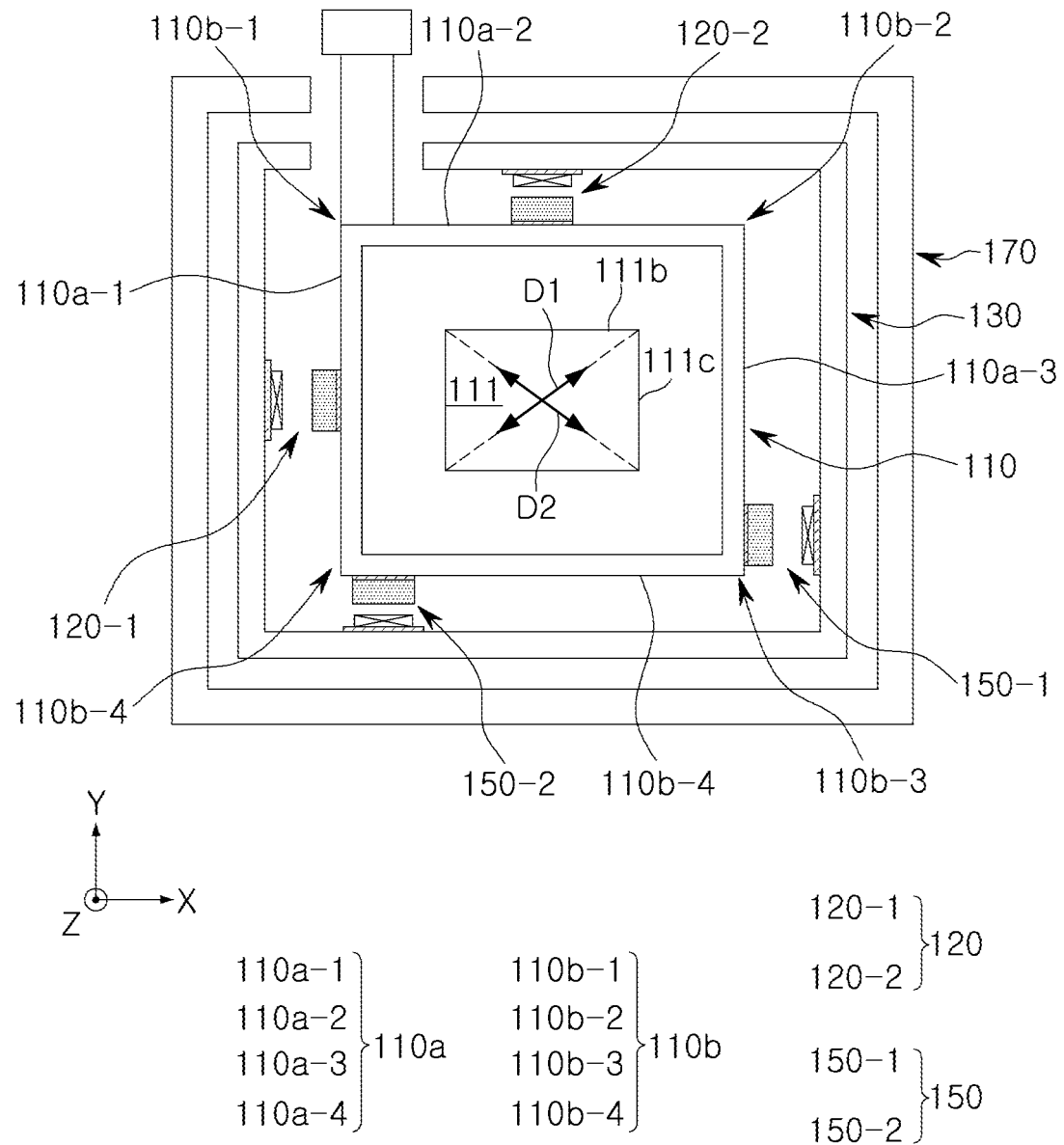

FIGS. 4A and 4B are diagrams illustrating arrangement of a first OIS driver and a second OIS driver according to an example embodiment.

Referring to FIG. 2B, FIG. 4A, and FIG. 4B, the second movable body 110 may include four side surfaces 110a-1, 110a-2, 110a-3, and 110a-4 forming a quadrangular shape, and two side surfaces adjacent to each other among the four side surfaces 110a-1, 110a-2, 110a-3, and 110a-4 may form a corner.

The second movable body 110 may include a first side surface 110a-1, a second side surface 110a-2, a third side surface 110a-3, and a fourth side surface 110a-4 in a clockwise direction. A first corner 110b-1 may be formed at the boundary between the first side surface 110a-1 and the second side surface 110a-2, a second corner 110b-2 may be formed at the boundary between the second side surface 110a-2 and the third side surface 110a-3, a third corner 110b-3 may be formed between the third side surface 110a-3 and the fourth side surface 110a-4, and a fourth corner 110b-4 may be formed between the fourth side surface 110a-4 and the first side surface 110a-1. The side surface 110a of the first movable body 110 may be a side surface of the sensor holder 113.

In an example embodiment, the four side surfaces 110a-1, 110a-2, 110a-3, 110a-4 may be parallel to the horizontal side 111b or the vertical side 111c of the image sensor 111, and the four corners 110b may be disposed in the diagonal directions D1 and D2 of the image sensor.

The first actuator 120 and the second actuator 150 may be disposed on side surfaces distinct from each other among the four side surfaces 110a-1, 110a-2, 110a-3, and 110a-4. For example, the 1-1 actuator 120-1, the 1-2 actuator 120-2, the 2-1 actuator 150-1, and the 2-2 actuator 150-2 may be disposed on the first side surface 110*a*-1, the second side surface 110*a*-2, the third side surface 110*a*-3, and the fourth side surface 110*a*-4, respectively.

Referring to FIGS. 4A and 4B, the second actuator 150 included in the second OIS driver may be disposed adjacent to the corner 110*b* of the second movable body 110. Since the second actuator 150 is disposed adjacent to the corner 110*b*, the second movable body 110 may rotate efficiently.

Referring to FIG. 4A, the 1-1 actuator 120-1 and the 1-2 actuator 120-2 included in the first OIS driver may be disposed in the center of a first side surface 110*a*-1 and a second side surface 110*a*-2. The 2-1 actuator 150-1 and the 2-2 actuator 150-2 included in the second OIS driver may be disposed on the third side surface 110*a*-3 and the fourth side surface 110*a*-4, respectively. The 2-1 actuator 150-1 and the 2-2 actuator 150-2 may be disposed adjacent to the second corner 110*b*-2 and the third corner 110*b*-3, respectively.

Referring to FIG. 4B, the 2-1 actuator 150-1 and the 2-2 actuator 150-2 included in the second OIS driver may be disposed on a third side surface 110*a*-3 and a fourth side surface 110*a*-4, respectively. The 2-1 actuator 150-1 and the 2-2 actuator 150-2 may be disposed adjacent to the third corner 110*b*-3 and the fourth corner 110*b*-4, respectively.

2.2. Tilting OIS 2.2.1. Structure

Referring to FIG. 2A, the sensor shifting module 100 may include a third OIS driver. The sensor shifting module 100 may include a third OIS driver for moving the first movable body 130 relative to the fixed body 170. The third OIS driver may rotate the first movable body 130 about an axis (e.g., the first axis A1 or the second axis A2 in FIG. 2B) orthogonal to the optical axis O with respect to the fixed body 170. The shaking correction may be implemented by translating the image sensor 111 in a direction orthogonal to the optical axis O, but since the size of the mobile camera has a relatively small size, the range of translation movement may be relatively small, and accordingly, when the degree of shaking is relatively large, the amount of correction may not reach the shaking. The third OIS driver may correct the shaking by tilting the image sensor 111, and may provide a shaking correction function of excellent quality even for relatively large shaking.

The first movable body 130 may be movably disposed in the fixed body 170. The first movable body 130 may move with respect to the fixed body 170 by the third OIS driver. The image sensor 111 may be coupled to the first movable body 130. The image sensor 111 may be movably coupled to the first movable body 130. For example, the image sensor 111 may be coupled to the second movable body 110, and the second movable body 110 may be movably coupled to the first movable body 130. The second movable body 110 may move relative to the first movable body 130 by the first OIS driver and/or the second OIS driver.

2.2.2. Third Actuator (Tilting)

Referring to FIGS. 2A and 2B, the third OIS driver may include a third actuator 160 disposed between the fixed body 170 and the first movable body 130. The third actuator 160 may include a third driving magnet 161 coupled to the first movable body 130 or the second movable body 110 and a third driving coil 162 coupled to the fixed body 170 to oppose the third driving magnet 161.

In an example embodiment, the third actuator 160 may further include a yoke 163. The yoke 163 may be disposed on one side of the third driving magnet 161 and/or the third driving coil 162.

In an example embodiment, the third driving magnet 161 may be the first driving magnet 121 of the first OIS driver or the second driving magnet 151 of the second OIS driver. That is, the first driving magnet 121 or the second driving magnet 151 may be included in a portion of the third OIS driver. For example, at least one of the 1-1 driving magnet 121-1, the 1-2 driving magnet 121-2, the 2-1 driving magnet 151-1, or the 2-2 driving magnet 151-2 may function as the third driving magnet 161. Accordingly, a component described as the third driving magnet 161 in the example embodiment may be understood as the first driving magnet 121 or the second driving magnet 151.

The third OIS driver may include a plurality of third actuators 160, and each of the third actuators 160 may include a third driving magnet 161 and a third driving coil 162. For example, the third OIS driver may include four third actuators 160 corresponding to the 1-1 actuator 120-1, the 1-2 actuator 120-2, the 2-1 actuator 150-1, and the 2-2 actuator 150-2, respectively.

In an example embodiment, the third actuator 160 may include a 3-1 actuator 160-1, a 3-2 actuator 160-2, a 3-3 actuator 160-3, and a 3-4 actuator 160-4.

Referring to FIG. 2B, the 3-1 actuator 160-1 may include a 3-1 driving magnet 161-1 and a 3-1 driving coil 162-1. The 3-2 actuator 160-2 may include a 3-2 driving magnet 161-2 and a 3-2 driving coil 162-2. The 3-3 actuator 160-3 may include a 3-3 driving magnet 161-3 and a 3-3 driving coil 162-3. The 3-4 actuator 160-4 may include a 3-4 driving magnet 161-4 and a 3-4 driving coil 162-4.

The 1-1 driving magnet 121-1, the 1-2 driving magnet 121-2, the 2-1 driving magnet 151-1, and the 2-2 driving magnet 151-2 may function as driving magnets 161-1, 161-2, 161-3, and 161-4 of the 3-1 actuator 160-1, the 3-2 actuator 160-2, the 3-3 actuator 160-3, and the 3-4 actuator 160-4, respectively. The 3-1 driving coil 162-1, the 3-2 driving coil 162-2, the 3-3 driving coil 162-3, and the 3-4 driving coil 162-4 may be disposed to oppose the 1-1 driving magnet 121-1, the 1-2 driving magnet 121-2, the 2-1 driving magnet 151-1, and the 2-2 driving magnet 151-2, respectively.

The third OIS driver may rotate the first movable body 130 about the first axis A1 and the second axis A2. The first axis A1 and the second axis A2 may be orthogonal to the optical axis and may intersect each other. For example, the first axis A1 may be parallel to the Y axis and the second axis A2 may be parallel to the X axis.

The 3-1 actuator 160-1 or the 3-3 actuator 160-3 may provide a moment in the first axis A1 direction to the first movable body 130. When a current is applied to the 3-1 driving coil 162-1, attractive force or repulsive force may be created between the 3-1 driving coil 162-1 and the 1-1 driving magnet 121-1, such that the first movable body 130 may be tilted relative to the fixed body 170 with respect to the first axis A1 orthogonal to the optical axis. When a current is applied to the 3-3 driving coil 162-3, attractive force or repulsive force may be created between the 3-3 driving coil 162-3 and the 2-1 driving magnet 151-1, such that the first movable body 130 may be tilted relative to the fixed body 170 with respect to the first axis A1 orthogonal to the optical axis.

The 3-2 actuator 160-2 and the 3-4 actuator 160-4 may provide a moment to the first movable body 130 in the second axis A2 direction. When a current is applied to the 3-2 driving coil 162-2, attractive force or repulsive force may be created between the 3-2 driving coil 162-2 and the 1-2 driving magnet 121-2, such that the first movable body 130 may be tilted relative to the fixed body 170 with respect to the second axis A2 orthogonal to the optical axis. When a current is applied to the 3-4 driving coil 162-4, attractive force or repulsive force may be created between the 3-4 driving coil 162-4 and the 2-2 driving magnet 151-2, such that the first movable body 130 may be tilted relative to the fixed body 170 with respect to the second axis A2 orthogonal to the optical axis.

In an example embodiment, a portion of the 3-1 driving coil 162-1, the 3-2 driving coil 162-2, the 3-3 driving coil 162-3, or the 3-4 driving coil 162-4 may not be provided. In an example embodiment, one of the 3-1 actuator 160-1 and the 3-3 actuator 160-3 providing the moment in the Y-direction may not be provided. In an example embodiment, one of the 3-2 actuator 160-2 and the 3-4 actuator 160-4 providing the moment in the X-direction may not be provided. For example, the third OIS driver may include only the 3-1 actuator 160-1 and the 3-2 actuator 160-2. As another example, the third OIS driver may include only the 3-3 actuator 160-3 and the 3-4 actuator 160-4.

Meanwhile, in the drawings, the first driving magnet 121 and the second driving magnet 151 included in a portion of the first OIS driver and the second OIS driver may be coupled to the first movable body 130, or may be coupled to the second movable body 110 alternatively. In this case, the third driving coil 162 may be disposed to oppose the first driving magnet 121 and the second driving magnet 151 coupled to the second movable body 110.

2.2.3. Ball Guide

In an example embodiment, the third OIS driver may include a tilt guide ball 164 disposed between the fixed body 170 and the first movable body 130. The tilt guide ball 164 may provide a tilt center for the fixed body 170 of the first movable body 130. For example, the first movable body 130 may be tilted around the tilt guide ball 164. The lower surface of the first movable body 130 and the bottom surface of the fixed body 170 may oppose each other in the optical axis O direction, and a groove for accommodating a portion of the tilt guide ball 164 may be formed in the lower surface of the first movable body 130 and the bottom surface of the fixed body 170, respectively.

2.2.4. Pulling

FIG. 2C illustrates the upper surface of the fixed body and the lower surface of the first movable body in an example embodiment.

Referring to FIGS. 2A and 2C, in an example embodiment, the third OIS driver may include pulling means disposed on the fixed body 170 and the first movable body 130, respectively, and opposing each other in a direction parallel to the optical axis O. The pulling means may include a first magnetic member 165 and a second magnetic member 166. A magnetic attraction may be created between the first magnetic member 165 and the second magnetic member 166, such that the first movable body 130 may be pulled to the bottom surface of the fixed body 170. Accordingly, the tilt guide ball 164 may maintain to be in contact with the first movable body 130 and the fixed body 170, such that the first movable body 130 may be smoothly tilted with respect to the fixed body 170.

One of the first magnetic member 165 or the second magnetic member 166 may be a magnet, and the other may be a magnet or a yoke. For example, the first magnetic member 165 may be a magnet and the second magnetic member 166 may be a yoke.

Referring to FIG. 2C, a plurality of first magnetic members 165 and a plurality of second magnetic members 166 corresponding to the plurality of first magnetic members 165 may be arranged around the tilt guide ball 164.

In an example embodiment, the third OIS driver may include a third position sensor configured to measure the amount of tilting of the first movable body 130. The third position sensor may be configured as a Hall sensor or a magnetoresistance sensor.

In an example embodiment, the third position sensor may be disposed in the third driving coil 162 and may oppose the first driving magnet 121 or the second driving magnet 151.

In an example embodiment, the third OIS driver may include a sensing magnet opposing the third position sensor. In an example embodiment, one of the first magnetic member 165 and the second magnetic member 166 may be a magnet and the other may be a yoke, and the magnetic member which is a magnet may function as a sensing magnet. For example, referring to FIG. 2A, the first magnetic member 165 may be a magnet, the second magnetic member 166 may be a yoke, the second magnetic member 166 may include a through portion therein, and a third position sensor may be disposed in the through portion.

2.3. Movement 2.3.1. Translation Movement

Figure 5A:
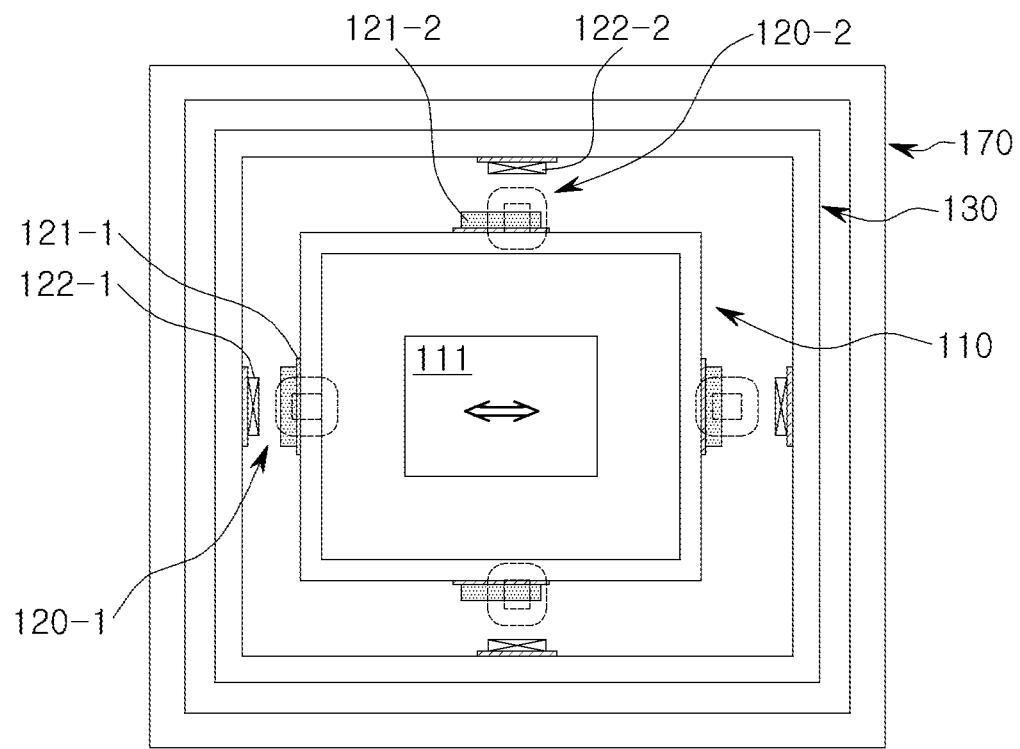
FIGS. 5A and 5B are diagrams illustrating movement of a second movable body due to a first OIS driver.
Figure 5B:
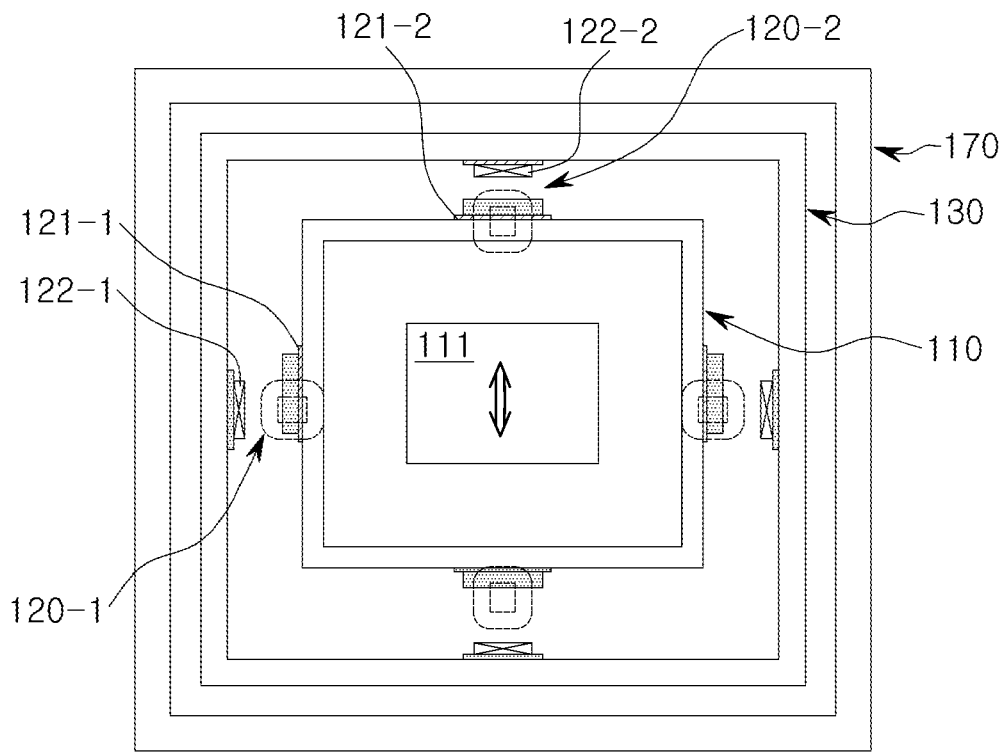

FIGS. 5A and 5B are diagrams illustrating movement of a second movable body due to a first OIS driver.

Referring to FIG. 5A, the 1-1 actuator 120-1 may move the second movable body 110 in the X-direction with respect to the first movable body 130. When a current is applied to the 1-1 driving coil 122-1, attractive force or repulsive force in the X-direction may be created between the 1-1 driving coil 122-1 and the 1-1 driving magnet 121-1 such that the second movable body 110 (or the image sensor 111) may move in the −X-direction or the +X-direction.

Referring to FIG. 5B, the 1-2 actuator 120-2 may move the second movable body 110 in the Y-direction with respect to the first movable body 130. When a current is applied to the 1-2 driving coil 122-2, attractive force or repulsive force in the Y-direction may be created between the 1-2 driving coil 122-2 and the 1-2 driving magnet 121-2, such that the second movable body 110 (or the image sensor 111) may move in the −Y-direction or the +Y-direction.

2.3.2. Rolling Movement

Figure 6A:
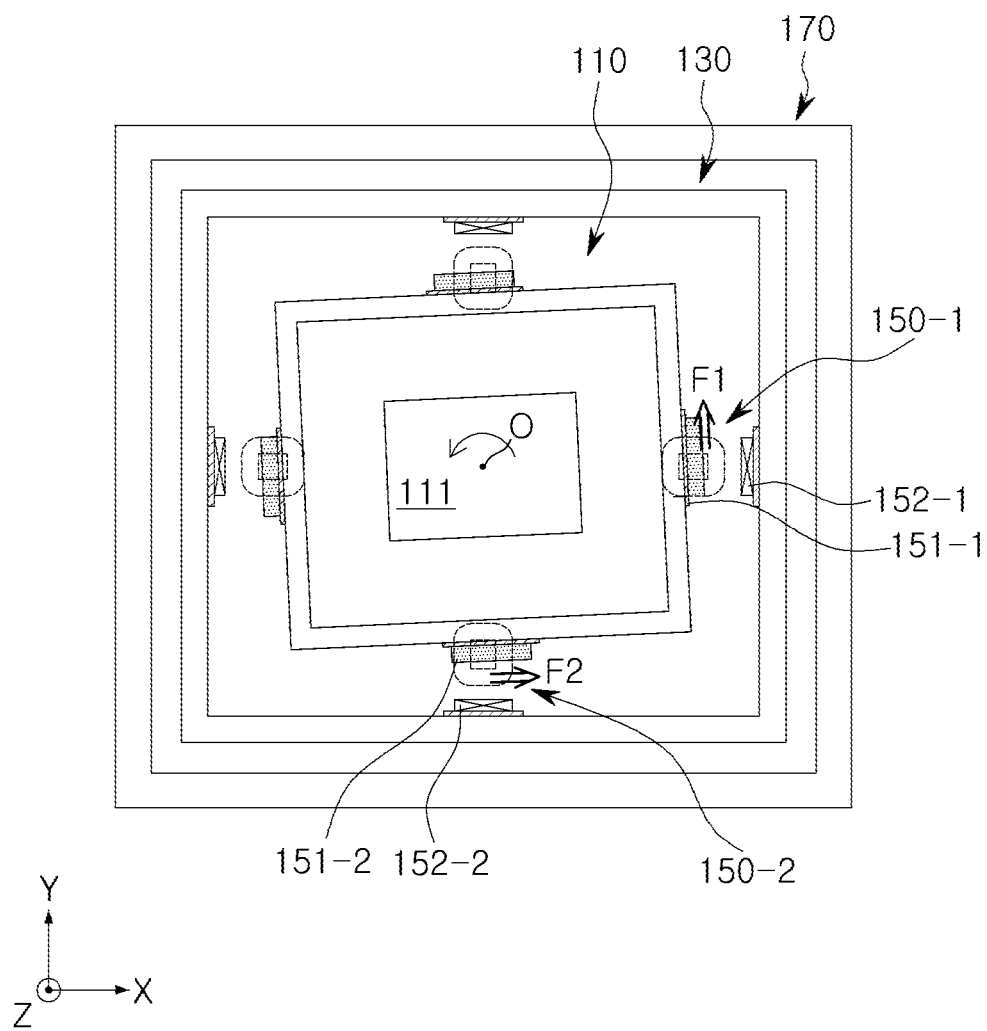
FIGS. 6A and 6B are diagrams illustrating rolling of a second movable body due to a second OIS driver.
Figure 6B:
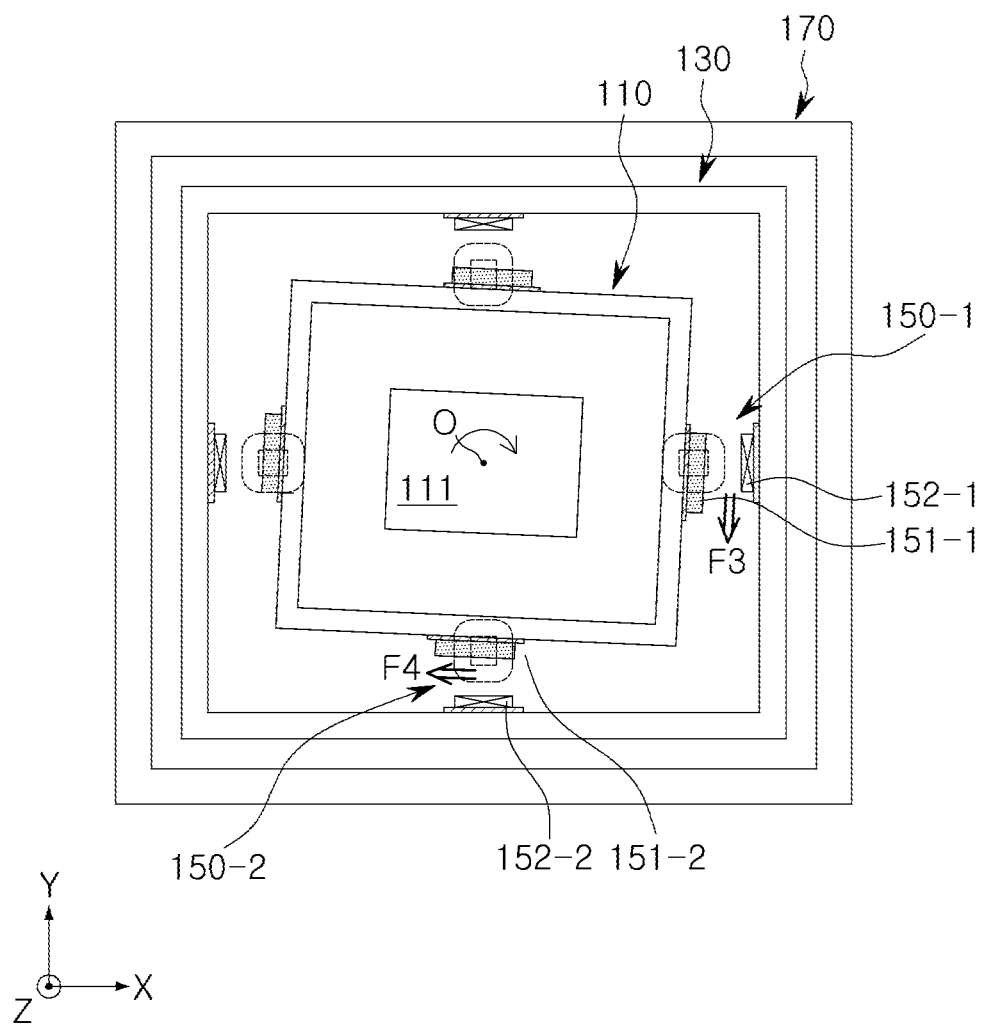

FIGS. 6A and 6B are diagrams illustrating rolling of a second movable body 110 due to a second OIS driver.

Referring to FIG. 6A, the 2-1 actuator 150-1 and the 2-2 actuator 150-2 may rotate the second movable body 110 in a counterclockwise direction with respect to the first movable body 130. The 2-1 actuator 150-1 and the 2-2 actuator 150-2 may provide a moment in a counterclockwise direction to the second movable body 110. For example, a Lorentz force may be created between the 2-1 driving magnet 151-1 and the 2-1 driving coil 152-1, and accordingly, a force F1 may act on the 2-1 driving magnet 151-1. A Lorentz force may be created between the 2-2 driving magnet 151-2 and the 2-2 driving coil 152-2, and accordingly, a force F2 may act on the 2-2 driving magnet 151-2. F1 and F2 may rotate the second movable body 110 in a counterclockwise direction.

Referring to FIG. 6B, the 2-1 actuator 150-1 and the 2-2 actuator 150-2 may rotate the second movable body 110 in a clockwise direction with respect to the first movable body 130. The 2-1 actuator 150-1 and the 2-2 actuator 150-2 may provide a moment in a clockwise direction to the second movable body 110. For example, a Lorentz force may be created between the 2-1 driving magnet 151-1 and the 2-1 driving coil 152-1, and accordingly, a force F3 may act on the 2-1 driving magnet 151-1. A Lorentz force may be created between the 2-2 driving magnet 151-2 and the 2-2 driving coil 152-2, and accordingly, a force F4 may act on the 2-2 driving magnet 151-2. F3 and F4 may rotate the second movable body 110 in a clockwise direction.

2.3.3. Tilting Movement

Figure 7A:
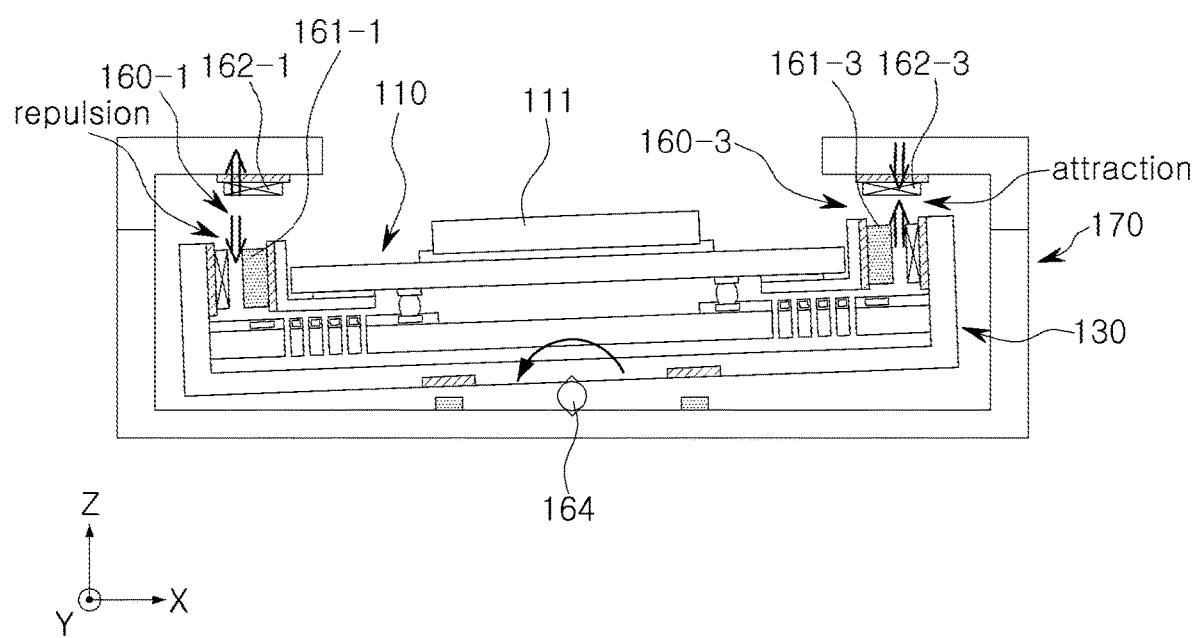
FIGS. 7A and 7B are diagrams illustrating tilting of a first movable body due to a third OIS driver.
Figure 7B:
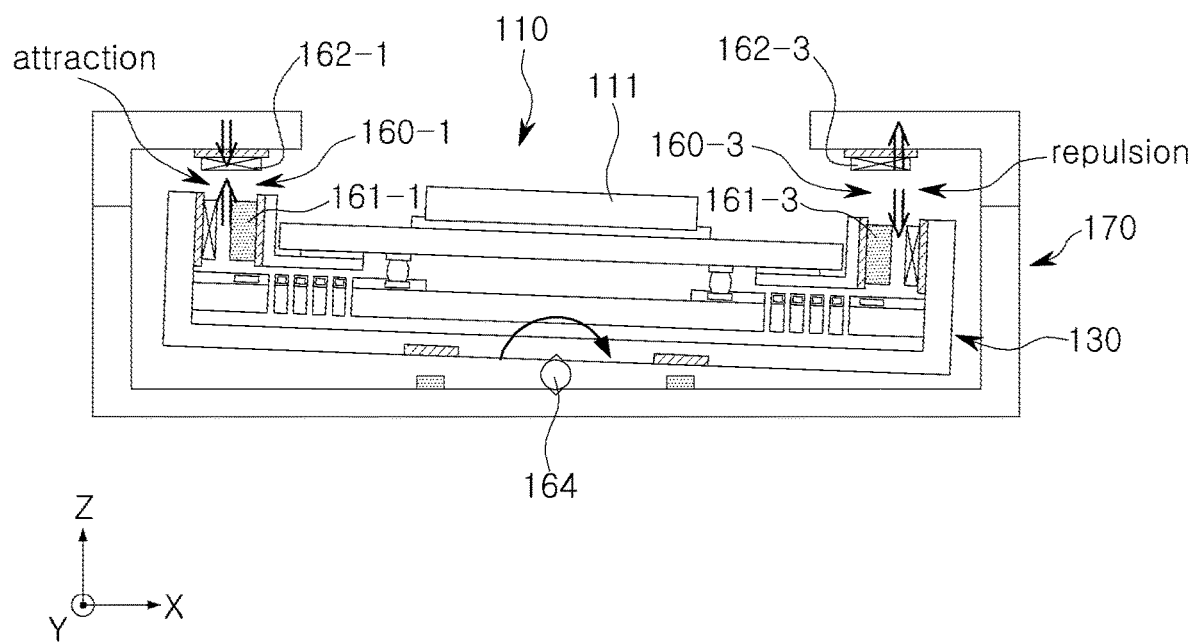

FIGS. 7A and 7B are diagrams illustrating tilting of the first movable body 130.

Referring to FIGS. 7A and 7B, the third OIS driver may rotate the image sensor about an axis orthogonal to the optical axis. For example, the third OIS driver may rotate the first movable body 130 and the second movable body 110 in a clockwise or counterclockwise direction with respect to the tilt guide ball 164.

FIGS. 7A and 7B illustrate a 3-1 actuator 160-1 and a 3-3 third actuator 160-3 responsible for rotation of the first movable body 130 in the first axis A1 direction (or Y-axis direction). Although not illustrated, the first movable body 130 may rotate about various axes (e.g., the first axis A1 or the second axis A2 in FIG. 2B) orthogonal to the optical axis by the plurality of third actuators including the 3-1 actuator 160-1 and/or the 3-3 actuator 160-3.

Referring to FIG. 7A, as a current is applied to the 3-1 driving coil 162-1, a repulsive force may be created between the 3-1 driving magnet 161-1 and the 3-1 driving coil 162-1, such that the first movable body 130 may rotate in a counterclockwise direction. Additionally or alternatively, as a current is applied to the 3-3 driving coil 162-3, attractive force may be created between the 3-3 driving magnet and the 3-3 driving coil 162-3, such that first movable body 130 may rotate in a counterclockwise direction with respect to the fixed body 170.

Referring to FIG. 7B, as current is applied to the 3-1 driving coil 162-1, attractive force may be created between the 3-1 driving magnet 161-1 and the 3-1 driving coil 162-1, such that the first movable body 130 may rotate in a clockwise direction. Additionally or alternatively, as a current is applied to the 3-3 driving coil 162-3, repulsive force may be created between the 3-3 driving magnet 161-3 and the 3-3 driving coil 162-3, such that the first movable body 130 may rotate in a clockwise direction with respect to the fixed body 170.

In an example embodiment, one of the 3-1 actuator 160-1 or the 3-3 actuator 160-3 in the third OIS driver may not be provided. This is because the 3-1 actuator 160-1 and the 3-3 actuator 160-3 may rotate the first movable body 130 in a clockwise or counterclockwise direction.

2.4. Deformation of Flexible Substrate

FIGS. 8A, 8B, 8C, and 8D are diagrams illustrating deformation of a substrate 140 according to movement of a movable body 110.

Figure 8A:
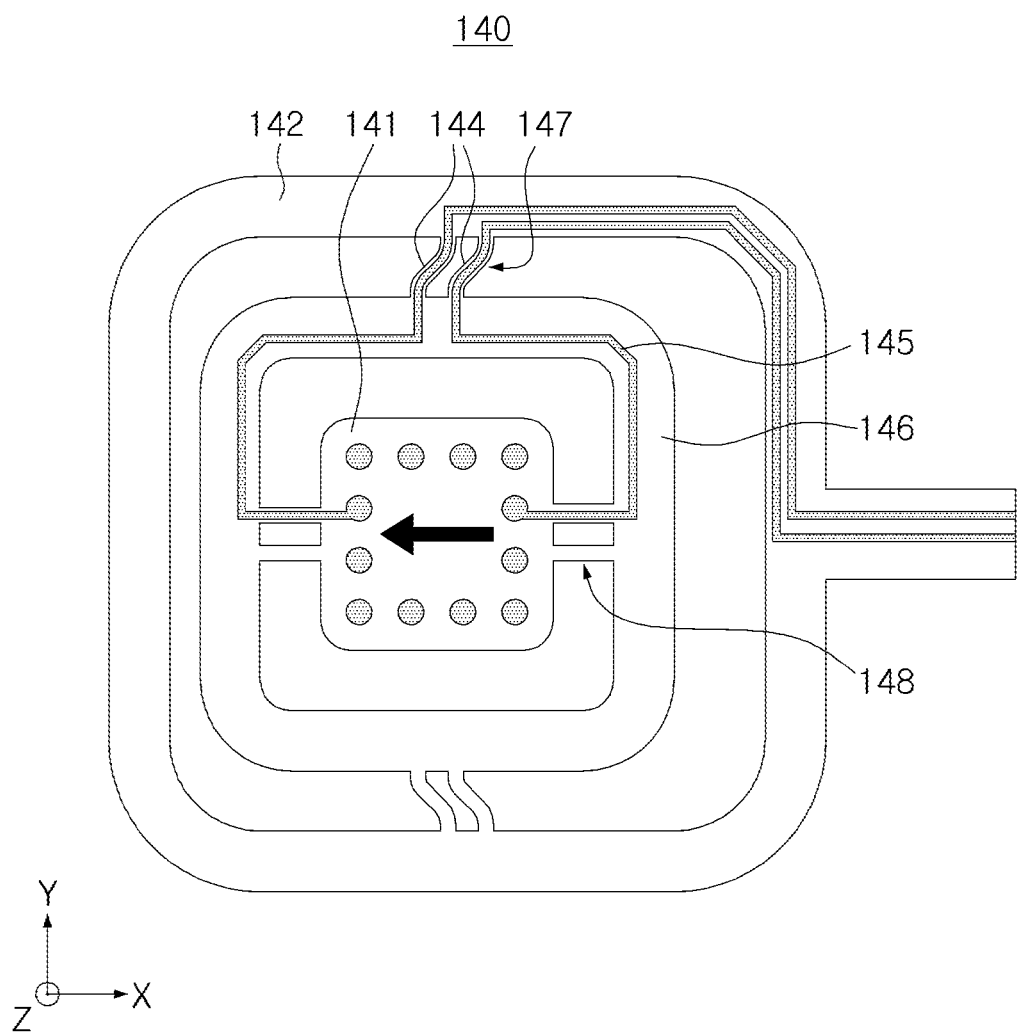
FIGS. 8A, 8B, 8C, and 8D are diagrams illustrating deformation of a substrate according to movement of a movable body.

Referring to FIG. 8A, when the second movable body 110 moves in the −X-direction, the movable portion 141 of the substrate 140 may also move in the −X-direction, and accordingly, the first bridge 147 connecting the guide 146 to the fixed portion 142 may be deformed. Since the bridge elements 144 included in the first bridge 147 have elasticity, the deformed first bridge 147 may provide resilient force to allow the movable portion 141 to return in a direction (the +X-direction) opposite to the movement direction. Accordingly, when no current is applied to the first OIS driver, the movable portion 141 may move in the +X-direction.

Figure 8B:
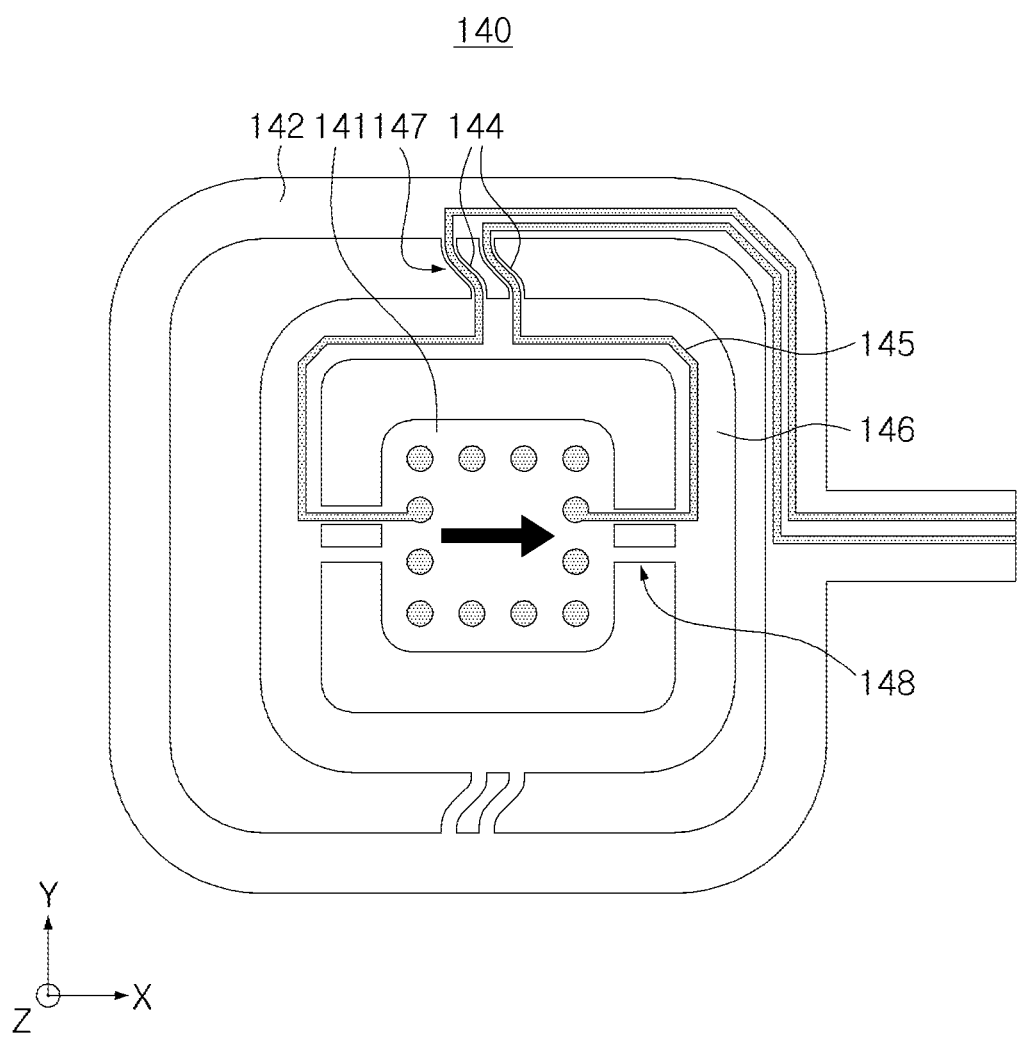

Referring to FIG. 8B, when the second movable body 110 moves in the +X-direction, the movable portion 141 of the substrate 140 may also move in the +X-direction, and accordingly, the first bridge 147 connecting the guide 146 to the fixed portion 142 may be deformed. Since the bridge elements 144 included in the first bridge 147 have elasticity, the deformed first bridge 147 may provide resilient force to allow the movable portion 141 to return in the direction (the −X-direction) opposite to the moving direction.

Figure 8C:
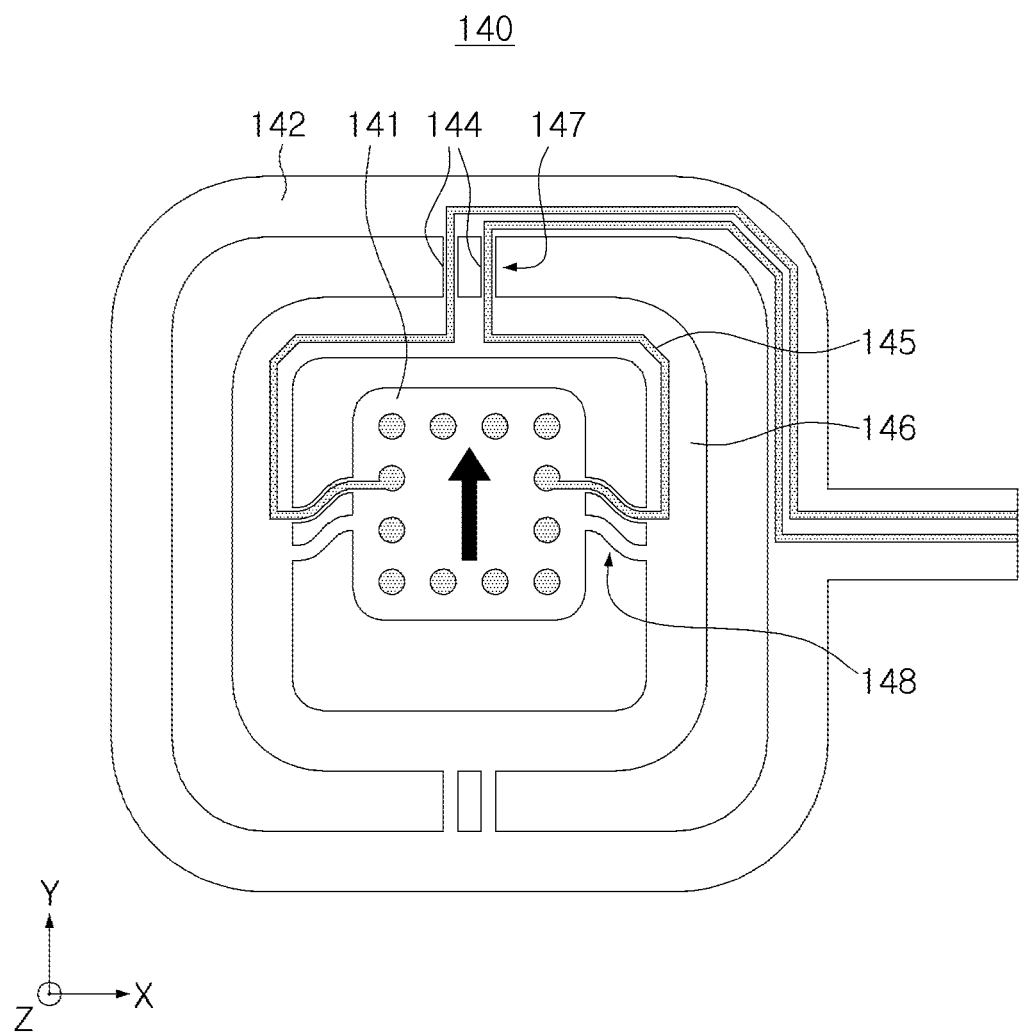

Referring to FIG. 8C, when the second movable body 110 moves in the +Y-direction, the movable portion 141 of the substrate 140 may also move in the +Y-direction, and accordingly, the second bridge 148 connecting the guide 146 to the movable portion 141 may be deformed. Since the bridge elements 144 included in the second bridge 148 have elasticity, the deformed second bridge 148 may provide resilient force to allow the movable portion 141 to return in the direction (the −Y-direction) opposite to the moving direction.

Figure 8D:
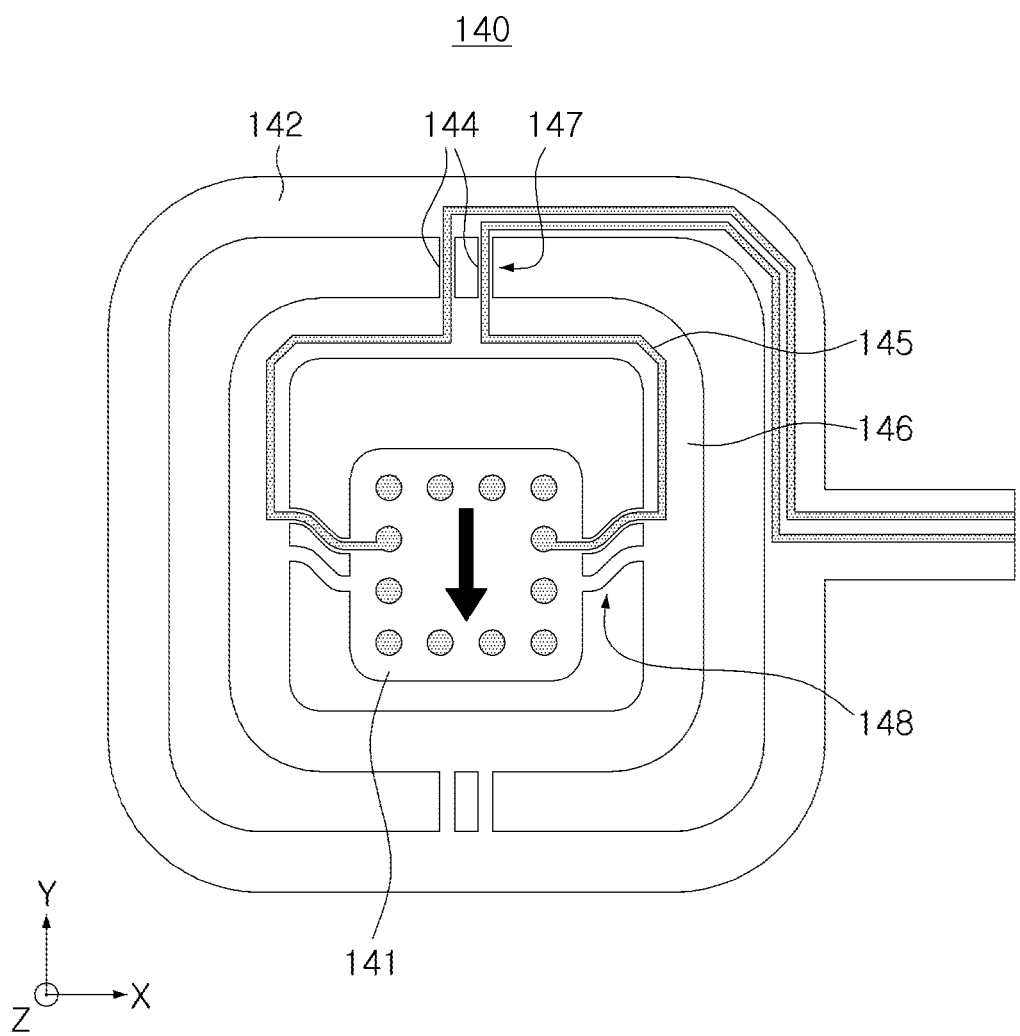

Referring to FIG. 8D, when the second movable body 110 moves in the −Y-direction, the movable portion 141 of the substrate 140 may also move in the −Y-direction, and accordingly, the second bridge 148 connecting the guide 146 to the movable portion 141 may be deformed. Since the bridge elements 144 included in the second bridge 148 have elasticity, the deformed second bridge 148 may provide resilient force to allow the movable portion 141 to return in the direction (the +Y-direction) opposite to the moving direction.

According to the aforementioned example embodiments, the camera may provide effective optical image stabilization with low power. Also, an excellent shaking correction function may be implemented by driving the image sensor in various directions.

The AF driver 23, OIS drivers, first, second, and third OIS drivers, OIS driver 12, sensors, sensor shifting modules, sensor shifting modules 10, 100, image sensors, image sensors 11, 111, actuators, first actuators 120, second actuators 150, and third actuators 160, first, second, and third position sensors, processors, memories, and other apparatuses, devices, units, modules, and components described herein with respect to FIGS. 1-8D are implemented by or representative of hardware components. Examples of hardware components that may be used to perform the operations described herein where appropriate include controllers, sensors, generators, drivers, memories, comparators, arithmetic logic units, adders, subtractors, multipliers, dividers, integrators, and any other electronic components configured to perform the operations described herein. In other examples, one or more of the hardware components that perform the operations described herein are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described herein. The hardware components may also access, manipulate, process, create, and store data in response to execution of the instructions or software. For simplicity, the singular term "processor" or "computer" may be used in the description of the examples described herein, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8D that perform the operations described herein are performed by computing hardware, for example, by one or more processors or computers, implemented as described above executing instructions or software to perform the operations described herein that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While specific examples have been illustrated and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A sensor shifting module, comprising:
    a fixed body;
    a first body movably disposed in the fixed body;
    a second body movably disposed in the first body and coupled to an image sensor having an imaging plane facing a first direction;
    a first driver configured to move the second body in a direction orthogonal to the first direction with respect to the first body;
    a second driver configured to rotate the second body about an axis parallel to the first direction with respect to the first body; and
    a third driver configured to rotate the first body about an axis orthogonal to the first direction with respect to the fixed body,
    wherein the third driver includes a tilt guide ball disposed between the fixed body and the first body to provide a tilt center for the first body.

2. The sensor shifting module of claim 1, wherein the first driver comprises a first actuator disposed between the first body and the second body, and the first actuator comprises a first driving magnet disposed on the second body, and a first driving coil disposed on the first body to oppose the first driving magnet in a direction orthogonal to the first direction.

3. The sensor shifting module of claim 2, wherein the second driver comprises a second actuator disposed between the first body and the second body, and the second actuator comprises a second driving magnet disposed on the second body, and a second driving coil disposed on the first body to oppose the second driving magnet in a direction orthogonal to the first direction.

4. The sensor shifting module of claim 3, wherein the second body comprises four side surfaces forming a quadrangular shape, and the first driving magnet and the second driving magnet are disposed on different side surfaces among the four side surfaces.

5. The sensor shifting module of claim 4, wherein the second body includes a first side surface and a second side surface forming a corner, and the second driving magnet is disposed on the first side surface or the second side surface and is disposed adjacent to the corner.

6. The sensor shifting module of claim 3, wherein the third driver comprises a third actuator disposed between the first body and the fixed body, and the third actuator comprises a third driving magnet disposed on the second body, and a third driving coil disposed on the fixed body to oppose the third driving magnet in the first direction.

7. The sensor shifting module of claim 6, wherein the third driving magnet is the first driving magnet or the second driving magnet.

8. The sensor shifting module of claim 7, wherein the third driver comprises a first magnetic member and a second magnetic member disposed on the fixed body and the first body, respectively, and opposing each other in the first direction.

9. The sensor shifting module of claim 1, further comprising:
a substrate mechanically connecting the second body to the first body and being deformed according to movement of the second body with respect to the first body.

10. The sensor shifting module of claim 9, wherein the substrate comprises electrical wirings electrically connected to the image sensor.

11. The sensor shifting module of claim 10,
wherein the substrate comprises a movable portion fixedly coupled to the second body, a fixed portion fixedly coupled to the first body, and a supporting portion interconnecting the movable portion and the fixed portion, and
wherein the supporting portion comprises a plurality of bridges comprising the electrical wirings embedded therein.

12. The sensor shifting module of claim 11, wherein the supporting portion comprises a guide disposed between the movable portion and the fixed portion and connected to the movable portion and the fixed portion through the plurality of bridges.

13. A camera module, comprising:
the sensor shifting module of claim 1; and
a lens module including at least one lens,
wherein light incident through the at least one lens falls on the imaging plane.

14. A camera module, comprising:
a lens module including at least one lens; and
a sensor shifting module,
wherein the sensor shifting module comprises:
a fixed body;
a first body movably disposed in the fixed body;
a second body movably disposed in the first body and coupled to an image sensor having an imaging plane facing a first direction;
a first driver configured to move the second body in a direction orthogonal to the first direction with respect to the first body;
a second driver configured to rotate the second body about an axis parallel to the first direction with respect to the first body;
a third driver configured to rotate the first body about an axis orthogonal to the first direction with respect to the fixed body; and
a substrate mechanically connecting the second body to the first body and being deformed according to movement of the second body with respect to the first body.

15. The camera module of claim 14,
wherein the substrate comprises a movable portion fixedly coupled to the second body, a fixed portion fixedly coupled to the first body, and a supporting portion interconnecting the movable portion and the fixed portion, and
wherein the supporting portion comprises a plurality of bridges comprising electrical wirings electrically connected to the image sensor embedded therein.

16. The camera module of claim 14, wherein the third driver comprises a third actuator disposed between the first body and the fixed body, and the third actuator comprises a third driving magnet disposed on the second body, and a third driving coil disposed on the fixed body to oppose the third driving magnet in the first direction.

17. The camera module of claim 16,
wherein the first driver or the second driver comprises a driving coil and a driving magnet opposing each other in a direction orthogonal to the first direction, and
wherein the driving magnet is the third driving magnet.

18. A sensor shifting module, comprising:
a first body;
a second body disposed on the first body;
an image sensor disposed on the second body and comprising an imaging plane facing a first direction,
a first driver configured to translate the second body in a direction orthogonal to the first direction with respect to the first body;
a second driver configured to rotate the second body about an axis parallel to the first direction with respect to the first body; and
a third driver configured to rotate the first body about an axis orthogonal to the first direction with respect to a fixed body.

19. The sensor shifting module of claim 18, further comprising:
a tilt guide ball disposed between the first body and the fixed body, wherein the first body is configured to rotate about the axis orthogonal to the first direction on the tilt guide ball; and
a substrate mechanically connecting the second body to the first body and being deformed according to movement of the second body with respect to the first body.

20. A camera module, comprising:
the sensor shifting module of claim 18; and
a lens module including at least one lens,
wherein light incident through the at least one lens falls on the imaging plane in the first direction.

* * * * *